United States Patent
Rogiers

(10) Patent No.: US 11,260,968 B2
(45) Date of Patent: Mar. 1, 2022

(54) MAINTENANCE APPARATUS FOR A SHOCK ABSORBER OF A LANDING GEAR, AND METHOD FOR MAINTAINING SUCH A SHOCK ABSORBER

(71) Applicant: Fokker Landing Gear B.V., Helmond (NL)

(72) Inventor: Kim Gert Andre Rogiers, Helmond (NL)

(73) Assignee: Fokker Landing Gear B.V., Helmond (NL)

( * ) Notice: Subject to any disclaimer, the term of this patent is extended or adjusted under 35 U.S.C. 154(b) by 491 days.

(21) Appl. No.: 16/344,294

(22) PCT Filed: Oct. 24, 2017

(86) PCT No.: PCT/NL2017/050692
§ 371 (c)(1),
(2) Date: Apr. 23, 2019

(87) PCT Pub. No.: WO2018/080303
PCT Pub. Date: May 3, 2018

(65) Prior Publication Data
US 2019/0270515 A1    Sep. 5, 2019

(30) Foreign Application Priority Data
Oct. 24, 2016   (NL) ..................... 2017665

(51) Int. Cl.
*B64C 25/60* (2006.01)
*B64F 5/40* (2017.01)

(52) U.S. Cl.
CPC ............... *B64C 25/60* (2013.01); *B64F 5/40* (2017.01)

(58) Field of Classification Search
CPC .................................. B64C 25/60; B64F 5/40
See application file for complete search history.

(56) References Cited

U.S. PATENT DOCUMENTS 2,955,625 A * 10/1960 Patterson .................. B64F 5/60
                                                                         141/49
3,889,904 A *  6/1975 Jones ........................ B64F 5/60
                                                                         244/104 R
(Continued)

FOREIGN PATENT DOCUMENTS

EP          3006769 A1 *  4/2016    ................ F16F 9/06
EP          3006769 A1     4/2016
(Continued)

OTHER PUBLICATIONS

JP-11171097-A Translation (Year: 1999).*
(Continued)

*Primary Examiner* — Richard R. Green
*Assistant Examiner* — Steven J Shur
(74) *Attorney, Agent, or Firm* — Nixon Peabody LLP

(57) ABSTRACT

The present invention relates to a maintenance apparatus for a shock absorber of a landing gear, comprising a liquid reservoir which can be connected to an interior space of the shock absorber via a liquid line, a gas reservoir which can be connected to the interior space via a gas line, a coupling member for sealingly coupling the liquid reservoir and the gas reservoir, wherein the maintenance apparatus is configured to allow an exchange to occur of liquid and gas between the liquid reservoir and gas reservoir, respectively, and the interior space, the maintenance apparatus comprising control means for determining that a partial volume of the interior space occupied by the gas reaches a reference level as a result of the exchange and for bringing the partial volume of the interior space of the shock absorber respectively occupied by the gas and the liquid to a target level. The invention also relates to a maintenance method.

27 Claims, 6 Drawing Sheets

(56) References Cited

U.S. PATENT DOCUMENTS

Figure 1:
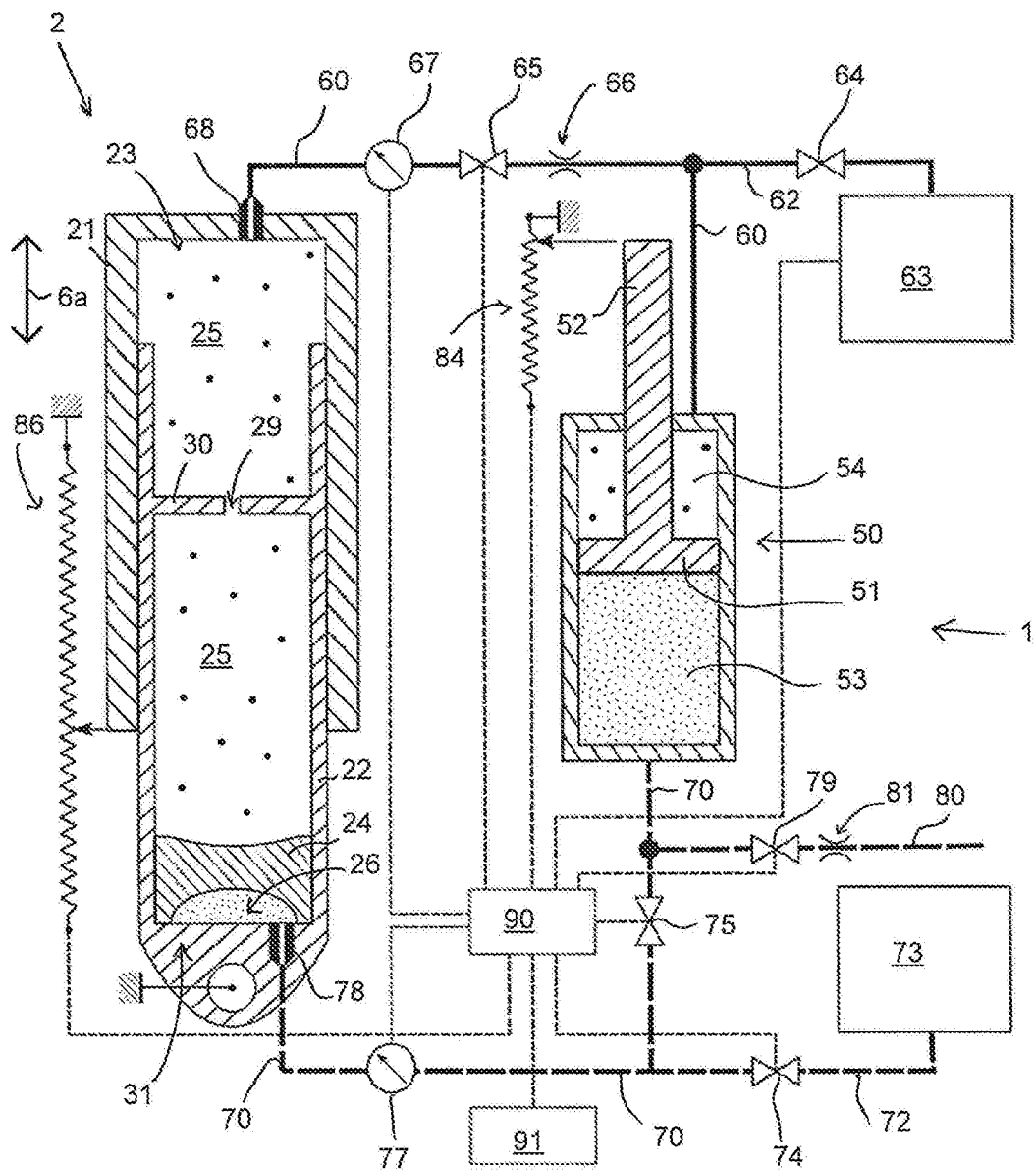

| | | | | |
|---|---|---|---|---|
| 4,252,012 A | * | 2/1981 | Koepler | G01B 5/0025 |
| | | | | 73/11.04 |
| 5,148,896 A | * | 9/1992 | Ralph | B64C 25/60 |
| | | | | 188/314 |
| 9,618,075 B2 | * | 4/2017 | Martin | B64C 25/60 |

FOREIGN PATENT DOCUMENTS

| | | | |
|---|---|---|---|
| EP | 3012481 A2 | | 4/2016 |
| JP | 11171097 A | * | 6/1999 |
| JP | H 11-171097 A | | 6/1999 |

OTHER PUBLICATIONS

International Search Report in International Patent Application No. PCT/NL2017/050692, dated Jan. 5, 2018 (4 pages).
Written Opinion in International Patent Application No. PCT/NL2017/050692, dated Jan. 5, 2018 (8 pages).

\* cited by examiner

MAINTENANCE APPARATUS FOR A SHOCK ABSORBER OF A LANDING GEAR, AND METHOD FOR MAINTAINING SUCH A SHOCK ABSORBER

CROSS-REFERENCE TO RELATED APPLICATIONS

This application is a national stage of Application No. PCT/NL2017/050692 filed Oct. 24, 2017, which claims priority from Netherlands Application No. 2017665 filed Oct. 24, 2016, which are both incorporated by reference in their entireties.

The present invention relates to a maintenance apparatus and method for maintaining a shock absorber of a landing gear of an aircraft, which shock absorber is filled with a gas and a liquid, to bring the partial volume of the volume of an interior space of the shock absorber respectively occupied by the gas and the liquid to a pre-determined target level.

A known method for maintaining a shock absorber of a landing gear comprises jacking up the aircraft so that the shock absorber is no longer loaded with the weight of the aircraft. Subsequently, all of the gas is let out of the shock absorber, with the gas flowing freely into the ambient air, until the pressure in the shock absorber is equal to the ambient pressure. The liquid level is then checked and, if necessary, corrected, depending on the amount of liquid present in the shock absorber at that time. Finally, gas is reintroduced into the shock absorber. A significant drawback is the need to jack up the aircraft, which, in the case of relatively large passenger planes for example, is time-consuming and not without risks.

JP 11-171097 discloses a device and method for measuring and filling liquid in a shock absorber of an aircraft. The shock absorber has an interior space with a single chamber filled with both gas and liquid. The method according to JP 11-171097 uses a cylinder connected in a parallel configuration which is connected to both the top and the bottom of the shock absorber. The liquid level can be read through an inspection glass in the cylinder, based on the principle of the law of the communicating vessels. Subsequently, pressurized liquid is forced into the shock absorber from an external liquid supply in order to thus bring the liquid level to a desired level. An advantage of this method is that the aircraft does not need to be jacked up. Drawbacks of this known device and method are that they can only be used on shock absorbers with an interior space filled with both gas and liquid in one and the same space, or chamber. However, shock absorbers often have a free piston in the interior space which separates a gas chamber and a liquid chamber. Such shock absorbers cannot be maintained according to this known method, partly because the free piston is not frictionless. In the known method, for example, it is not possible to determine whether liquid has entered the gas chamber of such a shock absorber, which is highly undesired due to the potential detrimental effect on the correct functioning of the shock absorber. Furthermore, in the known method, the liquid in the shock absorber must always be provided under the gas. The method is also laborious, inaccurate and cannot be automated, or is at least particularly difficult to automate, due to the need to position the cylinder next to the shock absorber so that that the liquid level even falls within the boundaries of the inspection glass, and due to the need to trace back the liquid level in the cylinder via a visual readout of the inspection glass by an operator and a comparison of the relative position of shock absorber and cylinder. In order to replenish the liquid in the shock absorber, an external liquid pump is needed to supply liquid to the shock absorber under high pressure, which makes the device expensive.

It is an object of the present invention to provide a method which can be automated and is to a high degree universally applicable for maintaining a shock absorber of a landing gear filled with liquid and gas, in order to bring the partial volume of an interior space of the shock absorber respectively occupied by the gas and the liquid to a pre-determined target level without the need to jack up, in other words to relieve the shock absorber of its load, and to provide a maintenance apparatus for effectively carrying out such a method.

Said object is achieved by a method according to the present invention, as defined in claim 19, and by a maintenance apparatus according to the invention, as defined in claim 1.

According to the invention, a maintenance apparatus is provided for a shock absorber of a landing gear of an aircraft. The shock absorber has an interior space with a volume in which a gas and a liquid are provided. During operation of the shock absorber, such as during the landing of the aircraft, the gas and the liquid are pressurized during operation, due to the load on the shock absorber. The gas and the liquid each occupy a partial volume of the volume of the interior space. The maintenance apparatus is configured to bring the partial volume respectively occupied by the gas and the liquid to a pre-determined target level. The maintenance apparatus comprises a liquid reservoir, which is configured to accommodate a pressurized liquid, a liquid line, which is connected to the liquid reservoir and which can be connected to the interior space of the shock absorber, in order to connect the liquid reservoir and the interior space of the shock absorber to one another to allow the flow of liquid, a gas reservoir, which is configured to accommodate a pressurized gas, a gas line, which is connected to the gas reservoir and which can be connected to the interior space of the shock absorber, in order to connect the gas reservoir and the interior space of the shock absorber to one another to allow the flow of gas, a coupling member, which is designed in order to sealingly couple the liquid reservoir and the gas reservoir to one another in such a way that, during use:

if the volume of one of the liquid reservoir and the gas reservoir increases, the volume of the other of the liquid reservoir and the gas reservoir decreases, a pressure of the gas in the gas reservoir provides a spring action to the pressurized liquid in the liquid reservoir via the coupling member, and the coupling member causes a pressure difference between the pressure in the liquid reservoir and the pressure in the gas reservoir.

The maintenance apparatus is configured to allow an exchange to occur during operation of, on the one hand, liquid between the liquid reservoir and the interior space of the shock absorber and, on the other hand, simultaneously, of gas between the gas reservoir and the interior space of the shock absorber, in order to bring the partial volume occupied by the gas to a pre-determined reference level as a result of the exchange.

The maintenance apparatus further comprises control means comprising input means which are configured to receive a signal, originating from detection means connected to the shock absorber during operation, which varies in dependence on the partial volume occupied by the gas, wherein the control means are configured to determine from that signal that the partial volume occupied by the gas reaches the reference level as a result of the exchange and to subsequently emit a signal, using output means of the control means, in order to bring the partial volume of the volume of the interior space of the shock absorber respectively occupied by the gas and the liquid to the target level on the basis of said signal.

The maintenance apparatus is preferably for a shock absorber of a landing gear of an aircraft in a state of the shock absorber in which it is loaded under the influence of the weight of the aircraft.

Preferably, the emission of the signal using the output means is also for ending the exchange on the basis of said signal, preferably before the partial volume of the volume of the interior space of the shock absorber respectively occupied by the gas and the liquid is brought to the target level.

An advantage of the maintenance apparatus according to the present invention is that it can be used to particularly effectively maintain shock absorbers of aircraft, with the possibility of a very high degree of automation, that is to say of the method being carried out in an automated manner. Due to the presence of said coupling member, there is a pressure difference during operation between liquid and gas, as a result of which, in combination with an external force, such as the load exerted by the aircraft on the shock absorber, said exchange can occur without this requiring additional equipment such as a high-pressure liquid pump. The gas reservoir also provides a spring action to the shock absorber, at least during said exchange, even if the reference level is a minimum level that can be reached, with there being no or at least substantially no gas present in the shock absorber after the minimum level that can be reached has been reached. This is of considerable advantage, as it also allows shock absorbers to be maintained where the shock absorber is subject to a varying load, such as caused by weather conditions, with the shock absorber being loaded under the influence of the weight of the aircraft during maintenance. This may include the influence of wind on the aircraft and/or the influence of wave movement on the aircraft, the latter occurring if the aircraft is on a ship. Due to the presence of said control means, which emit a signal if the partial volume of the interior space occupied by the gas reaches a reference level, it is possible to allow the maintenance to occur in a largely automated manner. This simplifies the operation of the maintenance apparatus and reduces the risk of errors by operators. It also makes it possible to achieve a short cycle time of the maintenance. Said measures of the maintenance apparatus mean that the maintenance apparatus can be used universally for maintaining various types of shock absorbers, both single-stage and dual-stage, with the possibility of carrying out the maintenance in a state of the shock absorber in which it is loaded under the influence of the weight of the aircraft. In shock absorbers with an above-mentioned free piston, the invention can be used to effectively protect the free piston against overloading.

The signal, originating from detection means connected to the shock absorber during operation, which varies in dependence on the partial volume occupied by the gas, does not need to vary in accordance with a continuous relationship, but may also vary discretely, or, in stages.

In a preferred embodiment of the maintenance apparatus the liquid line comprises a liquid shut-off valve for shutting off, in a closed position, and opening up, in an open position, the connection to allow the flow of liquid via the liquid line, the apparatus comprises a further gas line for connecting the interior space of the shock absorber to an external gas supply device to allow the flow of gas, which further gas line preferably connects to the gas line, the maintenance apparatus preferably also comprising the external gas supply device, the gas line comprises a first gas shut-off valve for shutting off, in a closed position, and opening up, in an open position, the connection to allow the flow of gas via the gas line, the further gas line comprises a second gas shut-off valve for shutting off, in a closed position, and opening up, in an open position, the connection to allow the flow of gas via the further gas line, the apparatus comprises a third gas shut-off valve for shutting off, in a closed position, and opening up, in an open position, an outlet for gas originating from the interior space of the shock absorber, which third gas shut-off valve is preferably provided in an outlet line which is operatively connected to the gas line.

In this case, the output means of the control means are preferably operatively connected to the liquid shut-off valve and the first, second and third gas shut-off valve, in order to make it possible to actuate said valves in an automated manner to allow them to be switched between the respective closed position and open position, by means of the emission of a signal to one or more of said valves.

In an embodiment, the first and/or the second and/or the third gas shut-off valve are jointly accommodated in a valve module.

Such a maintenance apparatus can be produced in a cost-effective way using standard available hydraulic and pneumatic parts. In an embodiment, said valves are electromagnetic valves. The external gas supply device preferably comprises a gas bottle in which gas is held under a greatly elevated pressure (conventionally of above 150 bar (15 MPa)). The pressure in, or at least generated by, the external gas supply device is such that it is higher than a pressure that arises in the shock absorber during operation of the maintenance apparatus, connected to the shock absorber. The gas preferably is nitrogen. As a result of being connected to the control means, the liquid shut-off valve and the first, second and third gas shut-off valve can be controlled in an effectively automated manner by means of the emission of a respective signal by the output means, on the basis of said determination as described above, to one or more of these valves. By closing the gas and/or liquid shut-off valve using the control means, the exchange can be ended. Subsequently, by opening the gas or liquid shut-off valve, the relevant partial volume can be brought to its target level. The further gas line is preferably connected to the gas line between the shock absorber and the gas shut-off valve.

The maintenance apparatus preferably comprises length-sensing means which interact with the shock absorber during operation of the apparatus, for sensing a length parameter of the shock absorber which is related to a length dimension in the longitudinal direction of the shock absorber, which length-sensing means are connected to the input means of the control means. The length dimension of the shock absorber is an indication of the volume, in other words the total volume, of its interior space. This length dimension can be sensed in an automated manner using the length-sensing means and a signal which is at least dependent thereon can be fed to the input means. In this case, the control means are preferably configured to determine a current value of the length parameter from that signal, after the control means have determined that the partial volume occupied by the gas reaches the reference level and, in dependence on said current value, to emit the signal for first bringing the partial volume occupied by the liquid to the target level and subsequently also bringing the partial volume occupied by the gas to the target level.

The length-sensing means preferably comprise a length-measuring instrument such as a linear potentiometer which can be coupled to the shock absorber. The length-sensing means are preferably active between a first and a second cylinder part of the shock absorber which are configured in such a way that they can slide into one another and which together determine the interior space of the shock absorber.

The control means preferably have a processor and a memory element, with the input means and output means being operatively connected to the processor. The memory element can store information about a type of shock absorber to be maintained using the maintenance apparatus. This information may comprise information about the relationship between the length dimension and the volume of the interior space, information about a pre-determined target value of a length dimension in the longitudinal direction of the shock absorber, and thus of said length parameter, information about the partial volume of the liquid when the partial volume of the gas in the interior space is at a reference level, such as the minimum level that can be reached. The maintenance apparatus may be configured to maintain several different types of shock absorbers. In this case, the input means may be connected to selection means in order to allow the selection of a specific shock absorber to be maintained. The selection means may comprise a switch or selection button to be operated by an operator or may be operated via a user interface such as a touch display. The memory can store information about the types of shock absorbers to be selected using the selection means. The maintenance apparatus may comprise a battery for supplying at least the control means with power. The maintenance apparatus may be configured to be supplied with power via an external electrical voltage source, such as the mains voltage.

The maintenance apparatus preferably comprises sensing means for sensing a parameter which is related to the volume of the liquid reservoir, which sensing means are connected to the input means of the control means, wherein the parameter is preferably a length dimension. On account of said exchange of liquid and gas between shock absorber and liquid or gas reservoir, respectively, a change in, for example, the volume of the liquid reservoir is an indication of a change in the partial volume of the shock absorber occupied by the liquid. Due to the presence of the sensing means, it is possible to carry out maintenance of a shock absorber in an even more highly automated manner using the maintenance apparatus. The sensing means preferably comprise a length-measuring instrument, such as a linear potentiometer which is or at least can be coupled to the coupling member or at least a part fixedly connected thereto for displacement. In this case, the control means are preferably configured to determine, on the basis of the sensed length parameter of the shock absorber and the parameter of the liquid reservoir, a volume of liquid to be supplied to the interior space or to be removed from the interior space, and to subsequently bring the partial volume of the interior space occupied by the liquid to the target level by means of supplying liquid from the liquid reservoir to the interior space of the shock absorber or removing liquid from the interior space of the shock absorber to the liquid reservoir, with continuous sensing of the parameter of the liquid reservoir. That is to say that a target value of the parameter of the liquid reservoir is determined from the determined volume of liquid to be supplied to the interior space or to be removed from the interior space, following which the parameter is brought to the target value by supplying liquid to the interior space from the liquid reservoir or removing liquid from the interior space to the liquid reservoir.

The maintenance apparatus preferably comprises a damping member for limiting the flow velocity of liquid and gas during said exchange. In an embodiment, the damping member may comprise a restriction for creating a flow resistance for the flow of liquid in the liquid line and/or for gas in the gas line, which restriction is preferably accommodated in the liquid line. Due to the presence of such a restriction, the flow velocity of liquid and gas during said exchange is significantly limited, or at least can be regulated, for example, in such a way that the flow velocity cannot become undesirably high during operation. Such a restriction, which is preferably provided in the liquid line, provides a significant resistance with respect to flow resistance which is present in, for example, lines, which can thus be realized in an accurate way. A restriction is thus a hydraulic or pneumatic component, which is specifically designed to cause a flow resistance. In an embodiment, the degree of resistance of the restriction can be adjusted, optionally in an automated manner using the control means. It is conceivable per se to select, for example, lines of such a, relatively small, diameter that this achieves a desired flow resistance. Alternatively, the damping member may comprise a damper which is connected to said coupling member in order to limit, via the coupling member, the flow velocity of liquid and gas during said exchange.

Preferably, the liquid reservoir and/or the gas reservoir is determined by a piston/cylinder assembly. More preferably, the piston or the cylinder of said cylinder assembly forms part of the coupling member.

In an embodiment, the liquid reservoir is determined by a piston/cylinder assembly and the gas reservoir is determined by a piston/cylinder assembly, wherein the piston of the piston/cylinder assembly of the liquid reservoir and the piston of the piston/cylinder assembly of the gas reservoir form part of the coupling member, preferably wherein the coupling member further comprises a loading member which, during operation, applies a force to the coupling member in order to bring about the pressure difference between the pressure in the liquid reservoir and the pressure in the gas reservoir. This results in a robust maintenance apparatus which is particularly simple from a constructional perspective. The loading member may be configured, for example, as a spring member in the form of a mechanical, pneumatic or hydraulic tension or compression spring or may be configured as a weight.

Preferably, the piston/cylinder assembly of the liquid reservoir and the piston/cylinder assembly of the gas reservoir are configured as a single double-acting cylinder with a piston which forms both the piston of the gas reservoir and of the liquid reservoir, which piston of the double-acting cylinder forms part of the coupling member, and which piston at one side delimits the liquid reservoir and at the other side delimits the gas reservoir, preferably wherein the coupling member comprises a loading member which, during operation, applies a force to the coupling member in order to bring about the pressure difference between the pressure in the liquid reservoir and the pressure in the gas reservoir. Such a double-acting cylinder with a piston which forms the coupling member, or at least forms part thereof, provides a saving in terms of parts, is simple to make and is reliable during operation.

Alternatively, it is conceivable, for example, to configure the liquid reservoir and the gas reservoir as separate piston/cylinder assemblies, with the pistons being connected to one another such as by a lever mechanism. With equal piston diameter, or active surface area, is it possible to select a respective length of the arm of the lever mechanism to be different in order to thus realize the pressure difference between the pressure in the liquid reservoir and the pressure in the gas reservoir. With different piston diameters, the length of the arm may be equal. Alternatively, with an equal piston diameter, an equal length of the arm may be selected but a loading member, such as a spring member, may be used which applies a spring force to the arm of the lever mechanism, in order to thus realize the pressure difference between the pressure in the liquid reservoir and the pressure in the gas reservoir. In this case, the volume displaced by the piston of the gas reservoir remains equal to the volume displaced by the piston of the liquid reservoir, as a result of which, during the exchange, the length of the shock absorber does not change as a result of the exchange.

It is advantageous if the piston has a piston rod which runs through at least one of the liquid reservoir and the gas reservoir, preferably through at least the liquid reservoir, until it reaches the outside of the double-acting cylinder. As a result, a difference in active surface area and thus a pressure difference between gas and liquid reservoir is provided in a simple manner. Moreover, the position of the piston in the cylinder can be measured in a simple manner via the piston rod extending outside the cylinder, for the purpose of sensing the parameter which is related to the volume of the liquid reservoir. A comparable effect is achieved with an alternative embodiment in which the piston has a continuous piston rod which runs through both the liquid reservoir and the gas reservoir until it reaches the outside of the double-acting cylinder, with it being possible to provide an external loading member to apply a force to the continuous piston rod in order to thus realize, or at least contribute to, the pressure difference between the pressure in the liquid reservoir and the pressure in the gas reservoir. The external loading member may be a gas spring which is integrated into or provided on the double-acting cylinder. In the latter case, the gas spring may also function as a gas buffer which forms the external gas supply means, with the further gas supply line then being connected to the gas buffer, or may function as a gas buffer in addition to said external gas supply means.

In embodiments of the maintenance apparatus with said loading member, a method according to the invention can also be used in a state of the shock absorber in which it is not loaded under the influence of the weight of the aircraft, such as is the case when the aircraft is jacked up, with wheels belonging to the shock absorber being clear of the ground, as the loading member then brings about said exchange.

The maintenance apparatus preferably comprises the detection means connected to the input means, which detection means can be connected to the shock absorber, in order to emit the signal to the input means, which signal varies in dependence on the partial volume occupied by the gas.

In a preferred embodiment, the detection means comprise a pressure gauge connected to the input means for measuring a pressure in the interior space of the shock absorber and for emitting a pressure signal to the input means, the detection means preferably comprising a liquid pressure gauge which is provided in connection with the liquid line and is connected to the input means, for measuring a liquid pressure in the liquid line and a gas pressure gauge which is provided in connection with the gas line and is connected to the input means, for measuring a pressure in the gas line. Using such a pressure gauge, or such liquid and gas pressure gauges, makes it possible to carry out said determination in a simple way with the control means. When the partial volume occupied by the gas reaches the reference level, in particular if the reference level is a minimum or maximum level that can be reached, a jump and/or pulse occurs in the detected pressure, which translates into a related jump and/or pulse in the signal from the pressure gauge to the input means of the control means. When using a liquid and a gas pressure gauge, the pressure difference between the two gauges changes when the reference level is reached. Therefore, the signal from the pressure gauge, or from the liquid and gas pressure gauges, varies in dependence on the partial volume occupied by the gas. An advantage of using both a liquid and a gas pressure gauge is that, in that case, the determination that the reference level has been reached is largely independent of external influences on the shock absorber, such as a varying force in the event that the maintenance apparatus is used on a ship or the force of wind on the aircraft. If an above-described restriction is used, the pressure gauge or respectively the liquid and gas pressure gauges are more preferably provided between the interior space of the shock absorber and the restriction, so that the restriction does not influence the pressure measurement. It is also conceivable per se for said reaching of the reference level to be sensed by virtue of the fact that the input means receive a signal from a sensor which is suitable for the purpose and which acts at the reference level, which sensor forms the detection means or at least forms part thereof. In the case of maintenance of a shock absorber with a piston which can move in a freely reciprocating manner in the interior space, this may be, for example, an inductive sensor or switching element which is provided at the reference level.

More preferably, said reference level is a maximum or minimum level that can be reached. An above-mentioned jump and/or pulse in the pressure in the interior space, or measured pressure difference can be determined highly reliably using the control means in the presence of said detection means configured as pressure gauge(s).

In an advantageous embodiment, the maintenance apparatus is configured for a shock absorber with a piston which can move in a freely reciprocating manner in the interior space and which separates the interior space into a liquid chamber for accommodating the liquid and a gas chamber for accommodating the gas, wherein the liquid line, during operation, is connected to the liquid chamber and wherein the gas line, during operation, is connected to the gas chamber, wherein said reference level is a maximum or minimum level that can be reached, determined by a first or second end position, respectively, of the piston in the interior space. Preferably, the reference level is the minimum level that can be reached, at which no, or at least substantially no, gas is present in the interior space—in the present embodiment in the gas chamber thereof. As a result, any liquid which may have unintentionally entered the gas chamber from the liquid chamber via the piston can also effectively be removed from the shock absorber.

In an embodiment, the shock absorber has two cylinder parts which can slide into one another in a longitudinal direction of the shock absorber and which together enclose the interior space. In an embodiment, the moveable piston of the shock absorber is provided in an inner cylinder part of the cylinder parts of the shock absorber which can slide into one another telescopically.

In an embodiment, the maintenance apparatus is configured for maintaining a shock absorber which is free of a piston which can move in the interior space, in which shock absorber a liquid surface of liquid in the interior space forms a division between the gas and the liquid in the interior space of the shock absorber, wherein the maintenance apparatus comprises a liquid blocking valve in the gas line, which is configured, during operation, to allow gas to pass through but, as a result of contact with liquid in the gas line, to close the gas line against the flow of liquid or gas, wherein said reference level is a minimum level that can be reached. With such a liquid blocking valve and using a pressure gauge or pressure gauges described above, the fact that the reference level has been reached can be determined by the control means, as said jump or pulse is also present in this case due to the fact that the liquid blocking valve closes as soon as it comes into contact with liquid. In this case, the gas line is provided in such a way with respect to the interior space that liquid flows into the gas line when the reference level of the partial volume of the interior space of the shock absorber which is occupied by gas is reached. If the line is connected to the interior space at the top end of the interior space, liquid will flow into the gas line as soon as there is no more gas present in the interior space, that is, if the reference level is the minimum level that can be reached.

Preferably, the pressure difference brought about by the coupling member is such that the pressure in the liquid reservoir is greater than the pressure in the gas reservoir, wherein said reference level is a minimum level that can be reached. This creates a particularly effective maintenance apparatus, in particular for maintaining a shock absorber having a said piston which can move in a reciprocating manner in the interior space.

It is advantageous, in particular in the embodiment of the maintenance apparatus mentioned directly above, for the output means of the control means to be configured to bring about, on the basis of the signal emitted by the output means after determination that the partial volume occupied by gas has reached the minimum level that can be reached, a flow of gas to the shock absorber, preferably from an external gas supply device, and with the flow of gas between the interior space and the gas reservoir preferably being interrupted, so that the time during which the piston is in its position in which the partial volume occupied by gas is minimal is as short as possible. To this end, an above-mentioned second gas shut-off valve can open on the basis of said signal, so that gas can flow to the interior space.

It is advantageous for the double-acting cylinder to be designed in such a way that an active surface area for liquid on the piston is smaller than an active surface area for gas on the piston.

It is further advantageous for, during operation, the pressure difference brought about by the coupling member to be such that the pressure in the liquid reservoir is smaller than the pressure in the gas reservoir, wherein said reference level is a maximum level that can be reached.

In a preferred embodiment, the control means are configured, during operation and after, in accordance with a step A), the interior space of the shock absorber has been connected to a liquid reservoir to allow the flow of liquid and has been connected to a gas reservoir to allow the flow of gas and an external gas supply device has been connected to the interior space, to carry out the following steps in an automated manner:

B) allowing the exchange to occur, on the one hand of liquid between the liquid reservoir and the interior space of the shock absorber, and on the other hand, simultaneously, of gas between the gas reservoir and the interior space of the shock absorber, until the control means determine that the partial volume occupied by the gas has reached a reference level, wherein the liquid reservoir and the gas reservoir are operatively connected to one another during said exchange in such a way that a pressure of the gas in the gas reservoir provides a spring action to the pressurized liquid in the liquid reservoir, C) bringing the partial volume occupied by the liquid to the target level by means of supplying liquid from the liquid reservoir to the interior space or removing liquid from the interior space to the liquid reservoir, D) bringing the partial volume of the interior space occupied by the gas to the target level by means of supplying gas to or removing gas from the interior space.

The invention also relates to a method for maintaining a shock absorber of a landing gear of an aircraft, which shock absorber has an interior space with a volume in which a gas and a liquid are provided, each occupying a partial volume of the volume of the interior space, wherein, according to the method, the partial volume respectively occupied by the gas and the liquid is brought to a pre-determined target level. The method comprises the steps of A) connecting the interior space of the shock absorber to a liquid reservoir to allow the flow of liquid and connecting the interior space of the shock absorber to a gas reservoir to allow the flow of gas, B) allowing an exchange to occur, on the one hand of liquid between the liquid reservoir and the interior space of the shock absorber, and on the other hand, simultaneously, of gas between the gas reservoir and the interior space of the shock absorber, until it is determined that the partial volume occupied by the gas has reached a reference level, wherein the liquid reservoir and the gas reservoir are operatively connected to one another during said exchange in such a way that the pressure of the gas in the gas reservoir provides a spring action to the pressurized liquid in the liquid reservoir, C) bringing the partial volume occupied by the liquid to the target level by means of supplying liquid from the liquid reservoir to the interior space or removing liquid from the interior space to the liquid reservoir, D) bringing the partial volume of the interior space occupied by the gas to the target level by means of supplying gas to or removing gas from the interior space.

Advantages of such a method and preferred embodiments thereof described below correspond to the advantages described above in relation to a maintenance apparatus according to the invention. Preferred embodiments of a maintenance apparatus according to the invention which are described above apply accordingly to preferred embodiments of a method according to the invention which are described above and are yet to be described below, and vice versa.

In an embodiment of the method, said method is for maintaining a shock absorber of a landing gear of an aircraft in a state of the shock absorber in which it is loaded under the influence of the weight of the aircraft.

Step A) precedes step B), and step B) is followed by steps C) and D), with step D) preferably taking place after step C).

In an embodiment, the method comprises, as part of step B), after determining that the partial volume of the interior space of the shock absorber occupied by the gas has reached a reference level, and preceding step C), the step of:

B2) sensing a length parameter of the shock absorber which is related to a length dimension in the longitudinal direction of the shock absorber, preferably using said length-sensing means, which length parameter is thus also associated with the volume of the interior space of the shock absorber.

It is further advantageous for the method to comprise, as part of step B), after determining that the partial volume of the interior space of the shock absorber occupied by the gas has reached a reference level, and preceding step C), the step of:

B3) sensing a parameter which is related to the volume of the liquid reservoir, preferably using said sensing means, wherein the parameter is preferably a length dimension.

The method preferably comprising, as part of step C):

determining, on the basis of the sensed length parameter of the shock absorber and the parameter of the liquid reservoir, a volume of liquid to be supplied to the interior space or to be removed from the interior space, and subsequently bringing the partial volume of the interior space occupied by the liquid to the target level by means of supplying liquid from the liquid reservoir to the interior space of the shock absorber or removing liquid from the interior space of the shock absorber, preferably to the liquid reservoir, with continuous sensing of the parameter of the liquid reservoir.

In an embodiment of the method, wherein said reference level according to step B) is a minimum level that can be reached, the method comprises, as part of step B), after step B2) and preceding step C) the step of:

B4) supplying gas to the interior space from an external gas supply device.

It is further advantageous for the method to comprise, as part of step D):

D1) sensing the length parameter of the shock absorber, and

D2) bringing the partial volume occupied by the gas to the target level by means of supplying gas to or removing gas from the interior space of the shock absorber.

Preferably, in order to carry out the method according to the invention, use is made of an above-described maintenance apparatus according to the invention, wherein, as part of step A), the liquid line and the gas line are brought into connection with the interior space, wherein steps B) and C) and D) are carried out using the control means, wherein the spring action according to step B) is provided via the coupling member.

In an embodiment of the method, as part of step B), only the liquid shut-off valve and the first gas shut-off valve of the valves mentioned above are opened. In an embodiment, as part of the determination according to step B2), a signal originating from detection means in the form of a pressure gauge connected to the interior space, or alternatively both an above-described liquid pressure gauge and gas pressure gauge, is received by the input means, which signal varies in dependence on the partial volume occupied by the gas. After it has been determined that the reference level has been reached, the exchange stops if the reference level is a minimum or maximum level that can be reached. It is also conceivable for the exchange to be actively terminated at that time by at least closing the liquid shut-off valve or the gas shut-off valve.

As part of step B), in accordance with a step B3), a parameter which is related to the volume of the liquid reservoir is sensed using the above-described sensing means. A partial volume occupied by the liquid calculated at that time from the likewise sensed value of the length parameter of the shock absorber and said parameter which is related to the liquid reservoir are preferably stored in the memory of the control means. On the basis of information on the shock absorber stored in the memory, the length parameter of the shock absorber is preferably used to determine what volume needs to be supplied to or removed from the shock absorber in order to bring the partial volume of the liquid in the shock absorber to its target level. This volume, or at least a value related thereto, is stored in the memory. Step B3 may be carried out before, during or at the same time as, or after step B2.

In an embodiment, step C) is carried out on the basis of said volume stored in the memory, with continuous sensing of the parameter of the liquid reservoir, as explained above. In an embodiment, if a volume of liquid needs to be removed, only the liquid shut-off valve and the third gas shut-off valve are opened, resulting in a flow of liquid from the interior space, or the liquid chamber, to the liquid reservoir. In an embodiment, if a volume of liquid needs to be supplied, only the liquid shut-off valve and the first and second gas shut-off valves are opened, following which gas flows from the external gas supply device into the gas reservoir, as a result of which liquid flows out of the liquid reservoir to the liquid chamber. When the target level of the partial volume of liquid is reached, on the basis of sensing a change in the parameter which is related to the liquid reservoir during said flow which has taken place, the liquid shut-off valve is then closed, via a signal by the output means.

In an embodiment, as part of step D1), the control means, by receiving a signal from the length-sensing means, determine whether the current length of the shock absorber is at a target value stored in the memory. If the current length is too small, as part of step D2), the second gas shut-off valve is opened for the supply of gas to the interior space, until the partial volume of the gas is at its target level. If the current length is too large, only the first and third gas shut-off valves are opened in order to reach the target level of the partial volume of the gas in the interior space.

In an embodiment of the method using a maintenance apparatus with an above-described liquid blocking valve and wherein the pressure difference brought about by the coupling member is such that the pressure in the liquid reservoir is greater than the pressure in the gas reservoir and wherein said reference level according to step B) is a minimum level that can be reached, step B) comprises allowing an exchange to occur, on the one hand of liquid between the liquid reservoir and the interior space of the shock absorber, and on the other hand, simultaneously, of gas between the gas reservoir and the interior space of the shock absorber, wherein liquid flows to the interior space and gas flows to the gas reservoir until the liquid blocking valve closes the gas line as a result of coming into contact with liquid in the gas line as a result of the fact that the partial volume of the interior space of the shock absorber occupied by the gas has reached a minimum level that can be reached, as a result of which it is determined using the control means that the partial volume of the interior space of the shock absorber occupied by the gas has reached the reference level.

Finally, the invention relates to the use of a maintenance apparatus according to the invention for maintaining a shock absorber of a landing gear of an aircraft in accordance with a method according to the invention, preferably while the shock absorber is in operation, loaded as a result of the weight of the aircraft, wherein the maintenance apparatus is configured to bring the partial volume respectively occupied by the gas and the liquid to a pre-determined target level.

In the scope of the present invention, means, modules or the like may also be provided as software which is executed by the processor.

Figure 7:
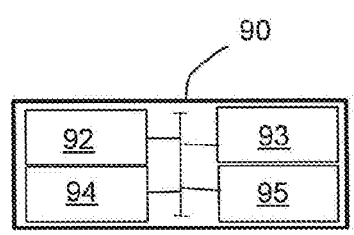
Figure 2:
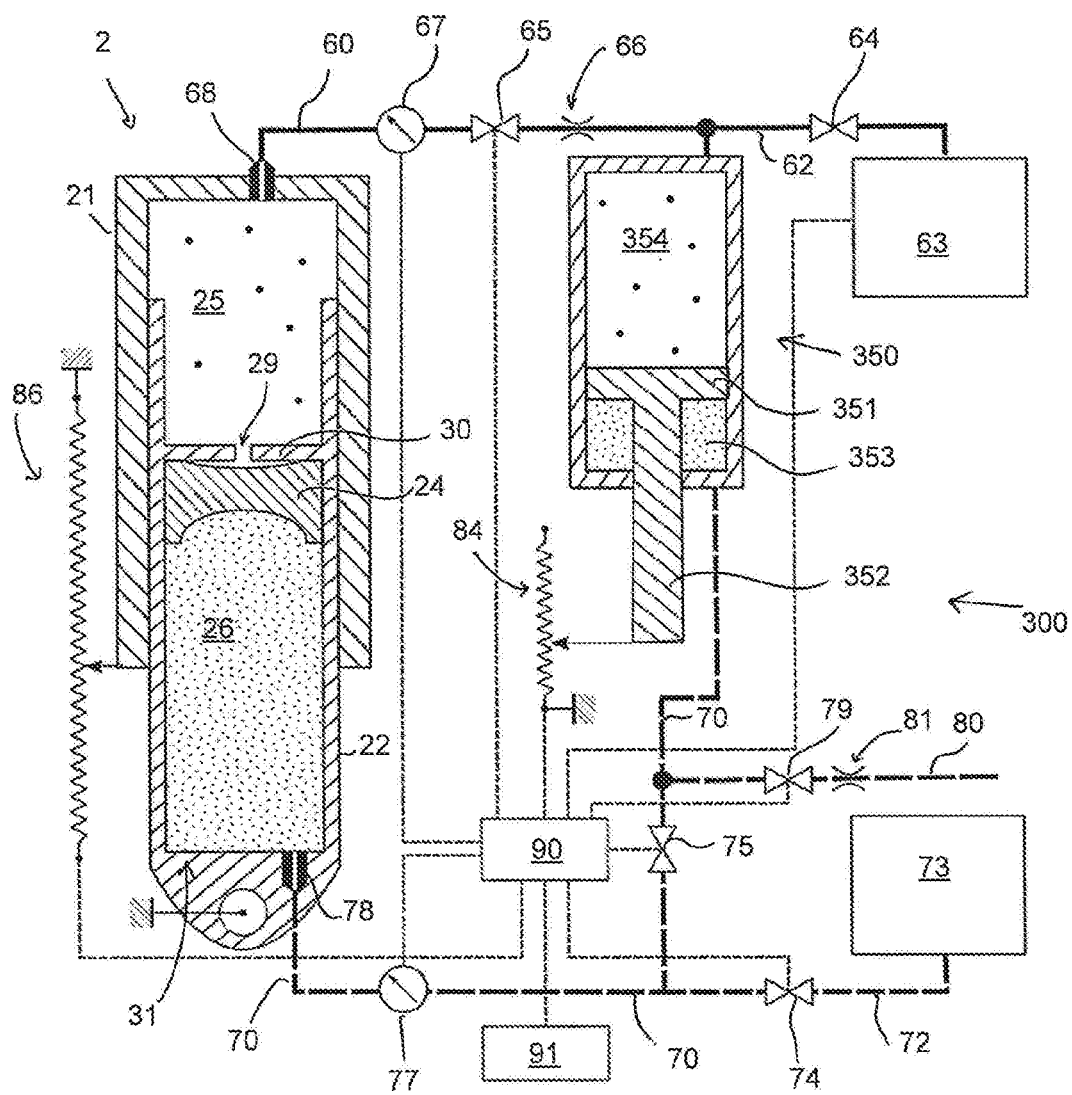
Figure 3:
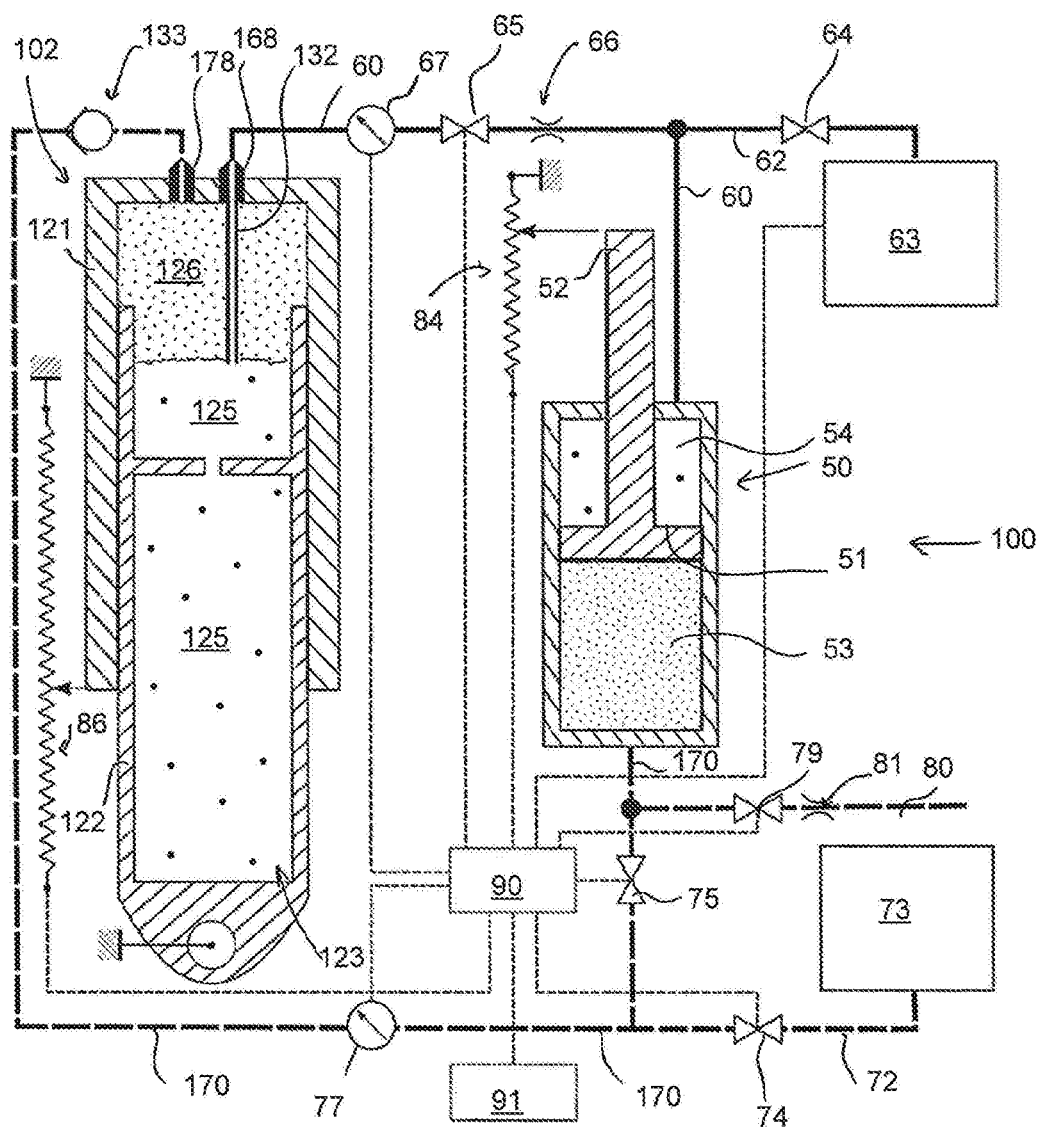
Figure 4:
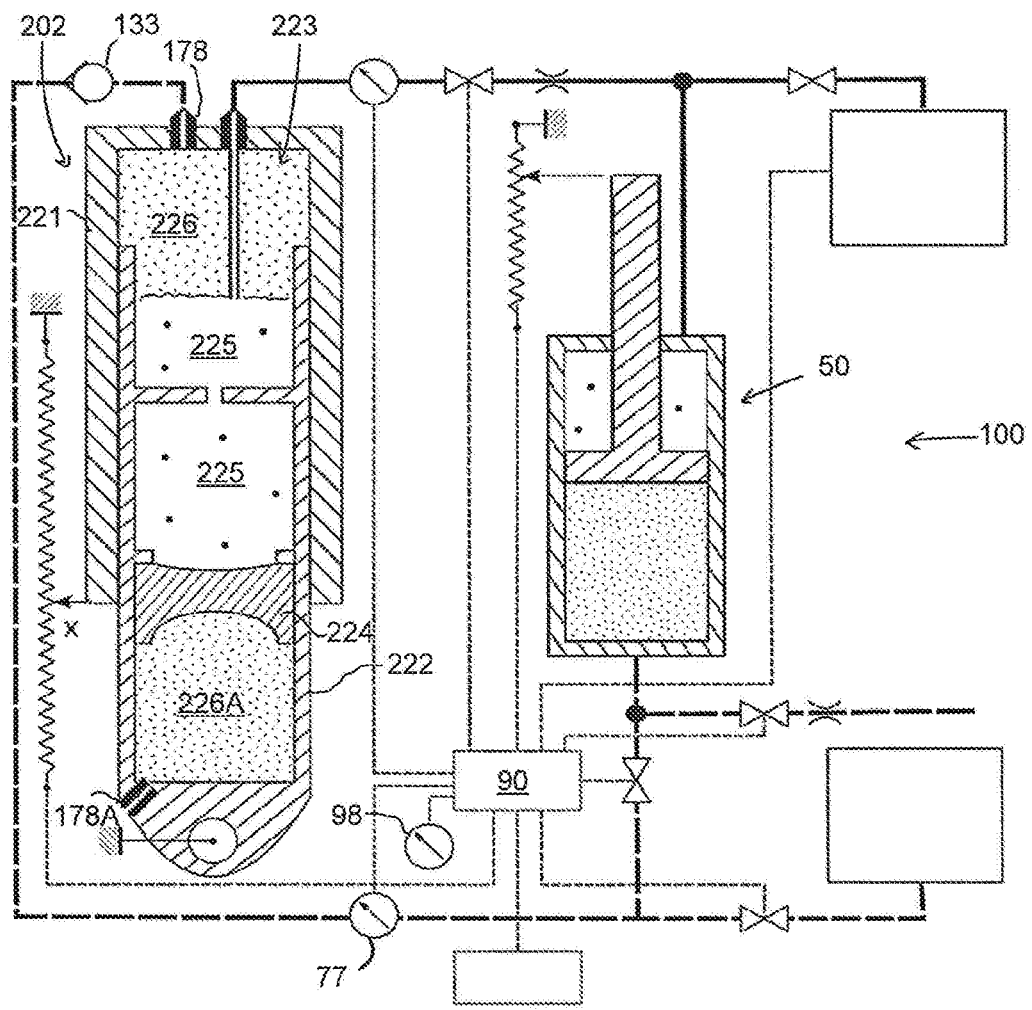
Figure 5:
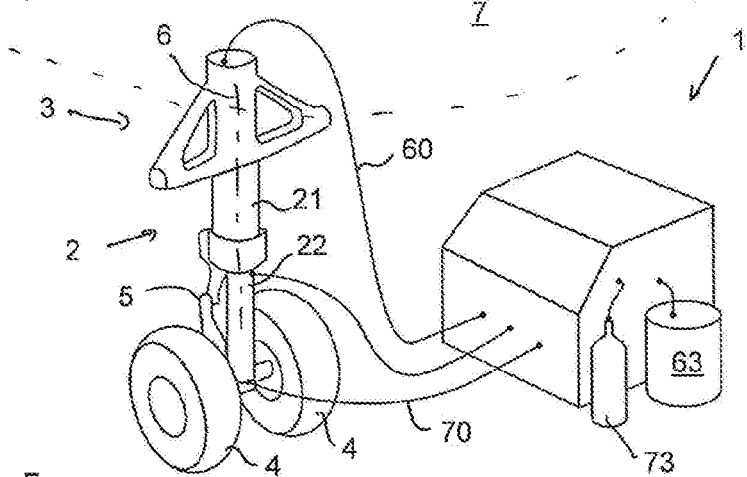
Figure 6:
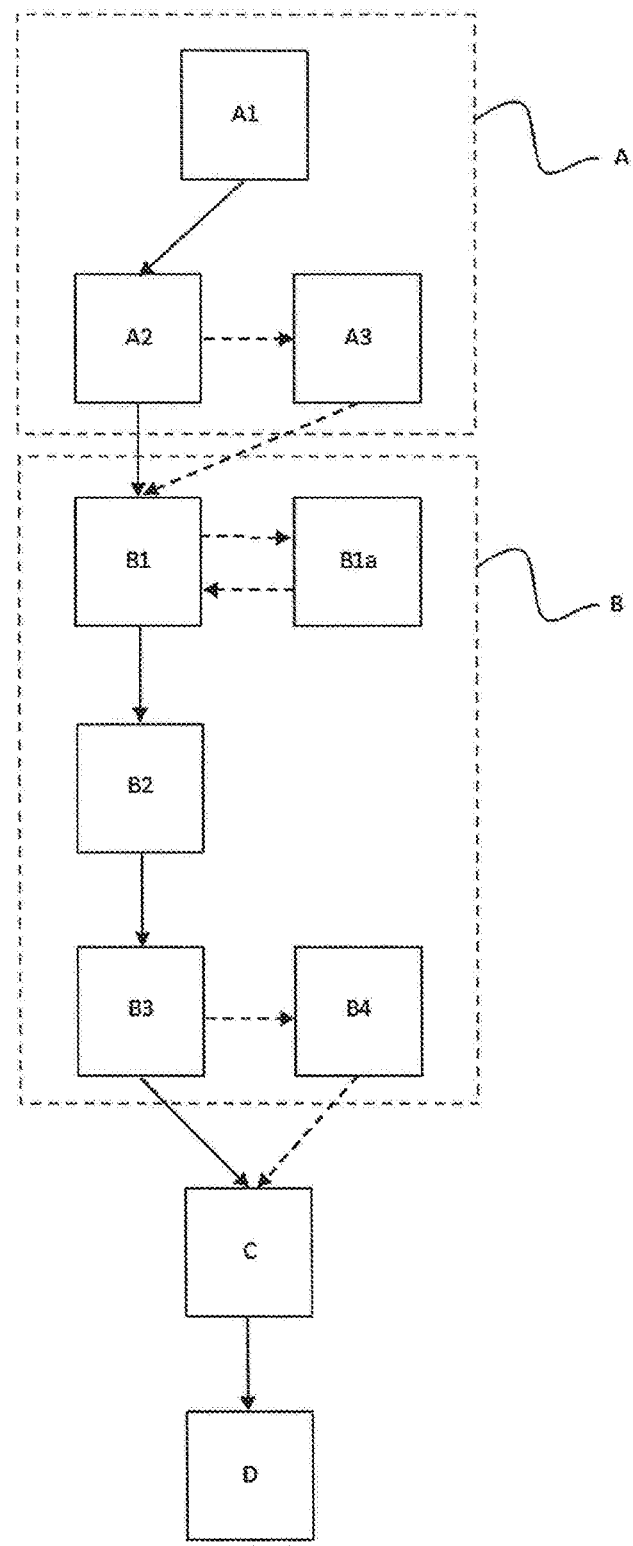
Figure 8:
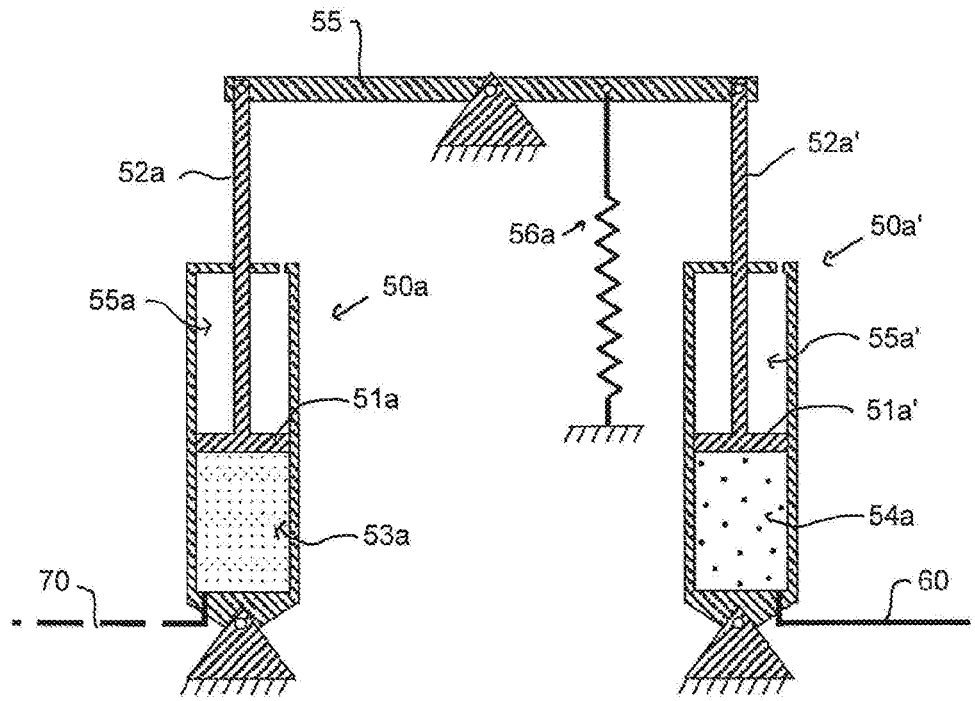
Figure 9:
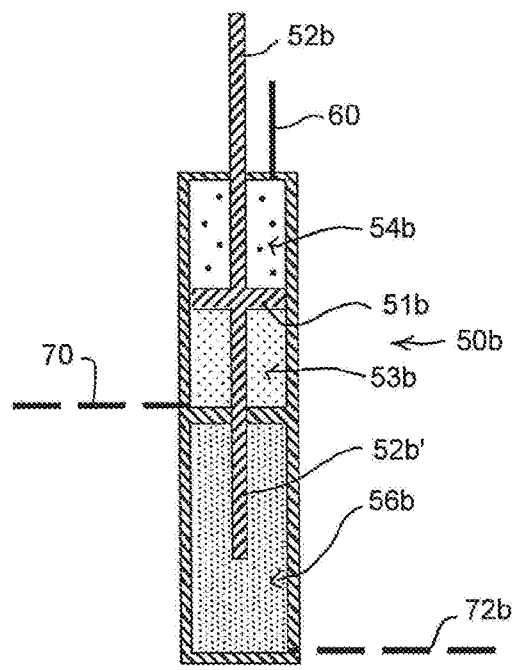

The present invention will be explained in greater detail below by means of the description of preferred embodiments of maintenance apparatus and methods according to the present invention, with reference to the following diagrammatic figures, in which:

FIG. 1 shows a connection diagram of a first preferred embodiment of a maintenance apparatus according to the invention, connected to a first variant of a shock absorber, FIG. 2 shows a further connection diagram of a second preferred embodiment of a maintenance apparatus according to the invention, connected to the first variant of a shock absorber, FIG. 3 shows yet a further connection diagram of a third preferred embodiment of a maintenance apparatus according to the invention, connected to a second variant of a shock absorber, FIG. 4 shows yet a further connection diagram of the third preferred embodiment of a maintenance apparatus according to the invention, connected to a third variant of a shock absorber, FIG. 5 shows the first preferred embodiment of a maintenance apparatus according to the invention in three-dimensional view, connected to the first variant of the shock absorber, FIG. 6 shows a flow diagram of a preferred embodiment of a method according to the present invention, FIG. 7 shows a part of the maintenance apparatus according to FIG. 1, FIG. 8 shows an alternative embodiment of a further part of the maintenance apparatus from FIG. 1, and FIG. 9 shows a further alternative embodiment of the further part of the maintenance apparatus from FIG. 1.

In FIGS. 1-4, liquid lines are denoted by continuous lines. Gas lines are denoted by thick dashed lines. Electrical connections for the transmission of electrical signals are denoted by thin dashed lines. The figures are diagrammatic and are intended to illustrate the operation of maintenance apparatus and methods according to the invention. Dimensions and ratios between dimensions are not necessarily in conformity with reality.

FIG. 5 diagrammatically shows a maintenance apparatus 1 for maintaining a shock absorber 2 of a landing gear 3. Maintenance is understood to mean bringing the partial volumes, respectively occupied by the gas and the liquid, of the interior space of variants of shock absorbers to be described in more detail below to a pre-determined target level. The landing gear 3 may be the landing gear of any aircraft 7 (illustrated highly diagrammatically in FIG. 5), such as for example an aeroplane or a helicopter. The landing gear 3 may be configured to be foldable. The shock absorber 2 has two cylinder parts: a first, outer cylinder part 21 and a second, inner cylinder part 22, which can slide into one another in a longitudinal direction 6a of the shock absorber 2. Underneath the second, bottom part 22, two wheels 4 are provided in order to support the landing gear on a surface. Instead of the two wheels 4 illustrated, more or fewer wheels may also be provided or alternative supporting elements, such as for example landing skids, may be provided. The first and second cylinder parts 21 and 22 are connected to one another via a torque link 5, or torsion link, so that rotation with respect to one another about the longitudinal axis 6 is blocked, and thus only translational movement with respect to one another in the direction 6a of the longitudinal axis 6 is enabled.

FIG. 1 shows a maintenance apparatus 1 in a state connected to the shock absorber 2.

The shock absorber 2 has an interior space 23 which is formed by the two cylinder parts 21 and 22. A piston 24 which can move in a freely reciprocating manner in the second cylinder part 22 is present in the interior space 23. The piston 24 separates the interior space 23 into a liquid chamber 25 for accommodating a pressurized liquid therein and a gas chamber 26 for accommodating a pressurized gas therein. In the present example, the volume of the interior space 23 is thus the total of the volume of the liquid chamber 25 and the gas chamber 26. The gas is conventionally nitrogen, but the use of a different gas, such as for example air or oxygen or a mixture of said gases, is not excluded within the scope of the present invention. The liquid is conventionally a hydraulic oil. The liquid chamber 25 has a top chamber part and a bottom chamber part, which is connected to the top chamber part via an open connection. The open connection is a passage 29 in an intermediate plate 30. The intermediate plate 30 forms a top end stop for the piston 24. The bottom, second cylinder part 22 also has a base 31 which forms a bottom end stop for the piston 24. The piston 24 can therefore be moved between a first, bottom end position illustrated in FIG. 1 in which the volume of the gas chamber 26 has a minimum level that can be reached, and a second, top end position (see FIG. 2) in which the volume of the gas chamber 26 has a maximum level that can be reached. The passage 29 forms a restriction for the liquid in order to provide a damping action in the event of highly dynamic loads, such as during landing of the aircraft.

A length dimension, in the longitudinal direction 6a, being parallel to the longitudinal axis 6, of the shock absorber 2 is determined by the volume of the interior space 23 of the shock absorber. If, for example, the part of the volume of the interior space occupied by gas, or in the present shock absorber 2 the volume of the gas chamber 26, remains the same, this length dimension, denoted below as length, increases when the partial volume of the interior space occupied by liquid, or in the present shock absorber 2 the volume of the liquid chamber 25, increases as a result of the supply of additional liquid to the liquid chamber.

The maintenance apparatus 1 has a double-acting cylinder 50 with a coupling member comprising a piston 51 which can move in a reciprocating manner in the cylinder and has a piston rod 52 extending freely outside the cylinder. The piston 51 separates, in a manner sealed against gas and liquid, a first cylinder chamber 53 from a second cylinder chamber 54. During use, the first cylinder chamber 53 is filled with gas, more specifically the same type of gas as is present in the gas chamber 26 of the shock absorber 2. The second cylinder chamber 54 is filled with liquid during use, more specifically the same type of liquid as is present in the liquid chamber 25 of the shock absorber 2.

As a result of the fact that the piston rod 52 extends from the piston 51 through the second cylinder chamber 54 outside the cylinder 50, the active surface area of the liquid on one side, in the present exemplary embodiment the side of the second cylinder chamber 54, of the piston 51 is smaller than the active surface area of the gas on the other side of the piston 51. As a result, the pressure of the liquid during use is always (provided that both pressures are above ambient pressure) higher than the pressure of the gas, or, there is a pressure difference during use between liquid and gas, on account of the equilibrium of forces on the piston 51. In order to aid readability with respect to the names of chambers 25, 26, 53 and 54, the first cylinder chamber of the cylinder 50 will be referred to below as gas reservoir 53 and the second cylinder chamber of the cylinder 50 as liquid reservoir 54.

By providing the piston 51 in the cylinder 50, the liquid reservoir 54 and the gas reservoir 53 are coupled, in a manner sealed against gas and liquid with respect to one another, in such a way that, during use, when the volume of one of the liquid reservoir 54 and the gas reservoir 53 increases, the volume of the other of the liquid reservoir 54 and the gas reservoir 53 decreases and that, during use, the pressure of the gas in the gas reservoir 53 provides a spring action to the pressurized liquid in the liquid reservoir 54, and thus to the pressurized liquid in the shock absorber 2, if the liquid in the interior space of the shock absorber is connected to the liquid reservoir 54 in open communication.

The liquid reservoir 54 is connected to the interior space 23 of the shock absorber 2, more specifically to the liquid chamber 25 thereof, via a liquid line 60 to allow the flow of liquid.

An external liquid supply reservoir 63 is connected to the liquid line via a supply line 62 having a shut-off valve 64. During use of the maintenance apparatus 1 for maintaining the shock absorber, the shut-off valve 64 is for opening or shutting off the line 62 in a closed position thereof. The external supply reservoir 63 may be used to already fill the liquid reservoir 54 of the cylinder 50 with liquid, such as at ambient pressure, before the line 60 is connected to the shock absorber 2. The external supply reservoir 63 may form part of a unit which comprises the maintenance apparatus 1 and optionally also an external gas supply device 73 as referred to below.

The liquid line 60 accommodates a liquid shut-off valve 65 for shutting off, in a closed position, and opening up, in an open position, the connection to allow the flow of liquid via the liquid line 60 between the liquid reservoir 54 and the liquid chamber 25. The liquid line 60 also accommodates a hydraulic restriction 66 for creating a hydraulic resistance. A liquid pressure gauge 67 is operatively connected to the line 60 between the restriction 66 and the shock absorber 2, in order to enable measurement of the liquid pressure in the line 60. The line 60 is detachably connected to the liquid chamber 25 via a connection nipple 68 in the first cylinder part 21 of the shock absorber. The connection nipple 68 is configured to allow the connection of the liquid line 60 to the shock absorber in the presence of an increased liquid pressure in the liquid chamber 25, in other words while the shock absorber forms a support for the aircraft and is thus loaded with the weight, or at least part of the weight, of the aircraft.

The supply line 62 is connected to the line 60 between the cylinder 50 and the valve 65.

The gas reservoir 53 is connected to the interior space 23 of the shock absorber 2, more specifically to the gas chamber 26 thereof, via a gas line 70 to allow the flow of gas. The gas line 70 accommodates a first gas shut-off valve 75.

An external gas supply device 73 is connected to the gas line 70 via a further supply line 72. Supply line 72 has a second shut-off valve 74 for opening or shutting off the line 72. The external gas supply device 73 may be used to already fill the gas reservoir 53 of the cylinder 50 with gas at increased pressure before the line 70 is connected to the shock absorber 2. Further use of the gas supply device 73 will be explained below. The external gas supply device 73 is illustrated highly diagrammatically in the figures and preferably comprises a nitrogen bottle containing nitrogen at an increased pressure, conventionally above 150 bar, which is higher than the pressure in the shock absorber 2.

The gas line 70 accommodates the first gas shut-off valve 75 for shutting off, in a closed position, and opening up, in an open position, the connection to allow the flow of gas via the gas line 70 between the gas reservoir 53 and the gas chamber 26. A gas pressure gauge 77 is operatively connected to the line 70 in order to enable measurement of the gas pressure in the line 70. The supply line 72 is connected to the line 70 between the first gas shut-off valve 75 and the gas pressure gauge 77. The line 70 is detachably connected to the gas chamber 26 via a connection nipple 78 in the second cylinder part 22 of the shock absorber 2. The connection nipple 78 is configured to allow the connection of the gas line 70 to the shock absorber in the presence of an increased gas pressure in the gas chamber 26, in other words while the shock absorber forms a support for bearing the aircraft and is thus loaded with the weight, or at least part of the weight, of the aircraft. Furthermore, a blow-off line 80 is provided which can be shut off via a third shut-off valve 79 and is connected to the line 70, and which forms an outlet for gas originating from the interior space of the shock absorber, in order to blow off gas from the line 70 to the ambient air, if desired. The blow-off line 80 is connected to the line 70 between the cylinder 50 and the first shut-off valve 75.

Furthermore, the apparatus 1 has sensing means comprising a position sensor 84 for sensing a position of the piston rod 52 with respect to the housing of the cylinder 50, seen in the direction of movement of the piston 51 and piston rod 52, which is an indication of the size of the volume of the gas reservoir 53 and the liquid reservoir 54 of the cylinder 50. The position sensor 84 is thus configured to sense a length parameter which is related to the volume of the liquid reservoir 54. The apparatus 1 also has length-sensing means comprising a position sensor 86 for sensing a mutual position, seen in the longitudinal direction 6, of the first cylinder part 21 and second cylinder part 22 of the shock absorber 2, which is an indication of the length of the shock absorber 2. During use of the apparatus 1, the position sensor 86 may thus be used to sense a parameter of the shock absorber 2 which determines a length dimension in the longitudinal direction 6 of the shock absorber 2.

The piston 24 of the shock absorber 2 may, as stated, move freely within its movement range delimited by the intermediate plate 30 and the base 31 of second cylinder part 22. On account of the equilibrium of forces on the piston 24, there is a relationship during use between the pressure in the gas chamber 26 and the pressure in the liquid chamber 25. In the present example, this relationship is a more or less fixed pressure difference of zero, or at least approximately zero, owing on the one hand to friction effects and on the other to the equal active surface area as shown in FIG. 1, at least as long as the piston is not situated in an end position. During use, as soon as the piston 24, for example, assumes its bottom end position, as shown in FIG. 1, with it coming to rest on the base 31 of cylinder part 22, this fixed pressure difference is disturbed, which can be sensed on the basis of a signal from pressure gauges 67 and 77. The same applies in the case where the piston 24 comes to rest against the intermediate plate 30, when the largest reachable volume of the gas chamber 26 and thus the largest reachable partial volume of the gas in the shock absorber is reached.

The maintenance apparatus 1 further has control means 90 (see also FIG. 7). The control means 90 have input means 92 and output means 93. The pressure gauges 67 and 77 and the position sensors 84 and 86 are operatively connected to the input means 92 by electrical means in order to emit respective signals to the input means. Said valves 65, 74, 75 and 79 are all operatively connected to the output means 93 by electrical means (indicated by the thin dashed lines in the figures) in order that they can each switch between the open position and closed position thereof on the basis of a respective signal emitted by the output means. In the present example, these signals are an electrical signal, with the valves 65, 74, 75, 79 being configured to switch between the open position and the closed position on the basis of an electrical signal.

The control means 90 have a processor 94 and a memory element 95. The input means 92 and output means 93 are operatively connected to the processor. In the memory element, software is stored which, if loaded by the processor during use of the maintenance apparatus, carries out the steps described below using the control means. The control means 90 are connected to a user interface 91, such as a touch display, by electrical means.

The above-described apparatus 1 can be used to maintain a shock absorber 2 of a landing gear as follows.

The following steps, as illustrated diagrammatically in FIG. 6, are carried out using the above-described preferred embodiment of the apparatus according to the invention in accordance with FIG. 1 and an above-described type of shock absorber in accordance with FIG. 1, in other words a shock absorber 2 having a freely moveable piston 24.

Step A: The apparatus 1 is brought into the vicinity of the aircraft 7 with the landing gear 3 of which the shock absorber 2 forms part (step A1). This can be done, for example, by driving the apparatus 1, which may be provided on a trolley as part of a unit, to the aircraft. The aircraft can continue to rest on its landing gear; it does not need to be jacked up or the like in order to relieve the shock absorber 2 of its load. The liquid reservoir 54 is or will be filled with the same liquid as is present in the liquid chamber 25 of the shock absorber 2. It is possible to replenish the liquid reservoir 54, if required, by connecting it to the external liquid supply reservoir 63 as a result of opening a, for example, manually operable valve 64. Using, for example, a manually operable siphon pump, liquid can be transferred from reservoir 63 to reservoir 54. It is preferably brought about in this case that the liquid reservoir 54 assumes approximately 75% of its maximum volume, or at least in such a way that steps B and C described below can be carried out.

In order to connect the liquid chamber 25 of the interior space 23 of the shock absorber 2 to the liquid reservoir 54 to allow the flow of liquid and to connect the gas chamber 26 to the gas reservoir 53 to allow the flow of gas, the liquid line 60 and the gas line 70 are connected to the shock absorber 2 via connection nipples 68, 78 provided for this purpose, with the valves 65 and 74 and 75 being closed (step A2) and with valves 64 and 79 optionally also being closed. The external gas supply device 73 is or will also be connected via the line 72, so that it can be connected to the gas chamber 26 when valve 74 is opened.

If they have not yet been switched on, the control means 90 of the maintenance apparatus 1 are activated, for example by a manually operable power button, optionally via a user interface 91, so that the software can be loaded by the processor and the following steps can be performed.

Optionally, the length of the shock absorber 2 is then increased slightly, for example by 5%, by supplying an amount of gas to the gas chamber 26 from the external gas supply device 73 after opening valve 74 manually or using the output means of the control means 90 (Step A3). This increases the ground clearance of the aircraft. Valve 74 is then closed once again.

Step B1: Subsequently, valves 65 and 75 are opened using the output means 93 of the control means 90, with valves 74, 79 and 64 remaining closed. As a result of the fact that, in cylinder 50, the pressure in the liquid reservoir 54 is always higher than the pressure in the gas reservoir 53 if the force on the piston 51 remains the same, an exchange of liquid from the liquid reservoir 54 to the liquid chamber 23 and of gas from the gas chamber 26 to the gas reservoir 53 will arise due to said difference in active surface area as a result of the piston rod 52. In other words, an exchange of liquid between the liquid reservoir and the interior space of the shock absorber and of gas between the gas reservoir and the interior space of the shock absorber will arise. As a result, the free piston 24, which forms the division between the liquid chamber 25 and the gas chamber 26 in the shock absorber 2, will sink towards the base 31. In this case, the speed of the flow of the exchange and the speed at which the free piston 24 sinks are dependent on the hydraulic resistance which is exerted on the liquid by, in particular, the hydraulic resistance in the form of restriction 66. Other components of the hydraulic system, such as lines and valves, also have a certain hydraulic resistance.

The liquid pressure and gas pressure, respectively, are measured by the two pressure gauges 67, 77, forming part of the detection means. As soon as the piston 24 of the shock absorber 2 reaches its end position against the base 31 of cylinder part 22, which means that the partial volume of the interior space occupied by the gas, or the volume of the gas chamber 26, has reached a minimum level that can be reached, the control means, on the basis of the signals from the pressure gauges received via the input means, will sense a change in the relative pressure difference of the liquid with respect to the gas or at least of a signal related thereto, since in any case the pressure in the gas chamber 26 decreases at that time with respect to the pressure in the liquid chamber 25, as a result of which it is detected that the partial volume of the interior space of the shock absorber occupied by the gas has reached a minimum level that can be reached, being the reference level.

Step B2: At that time, the value of a length parameter of the shock absorber 2 is sensed using the position sensor 86 and stored in the memory element 95 of the control unit. On account of the minimum level of the partial volume of the interior space occupied by the gas, which is known at that time, this value is an indication of the partial volume of the interior space occupied by the liquid at that time, or the volume of the liquid chamber 25. This volume of the liquid chamber can be calculated by the control means 90 from the sensed length parameter and data on the shock absorber which are stored in the memory element 95. In accordance with step B3, the position of the piston rod 52 is sensed using position sensor 84 and stored in the memory element of the control unit. As a result, the volume of the liquid reservoir 54 is also known. Valve 75 is also closed.

As a result of the fact that, as described above in step B1, extra liquid has flowed from the liquid reservoir 54 into the liquid chamber 25 during the exchange of gas and liquid between cylinder 50 and shock absorber 2, the volume of liquid in the liquid chamber 25 is greater than desired, in other words greater than the target level, in accordance with the specification of the shock absorber. From said length of the shock absorber 2 sensed using the position sensor 86 and known information about the geometry of the shock absorber 2, it is possible to infer the volume of liquid which must ultimately be removed from the shock absorber 2 in order to bring the volume occupied by the liquid in the liquid chamber 25 to the pre-determined target level. This volume of liquid to be removed, or at least a parameter related thereto, is stored in the memory element of the control unit 90.

Step B4: Subsequently, valve 74 is opened and an amount of gas is supplied from the external gas supply device 73 to the gas chamber 26, which amount is at least such that the shock absorber 2 assumes a length which is large enough to guarantee sufficient ground clearance of the aircraft during performance of step C. As a result, the piston 24 moves out of its end position again. Subsequently, valve 74 is closed again. It is advantageous to keep the amount of time that the piston 24 is in an end position as short as possible, in order to as far as possible prevent an undesired loss of spring action of the shock absorber due to unexpected failure of the maintenance apparatus. It is also the case in practice that the free piston of a shock absorber, such as the piston 24 of shock absorber 2, only has limited mechanical resistance to being in an end position thereof, due to the pressure difference which is then present over the piston and due to the mechanical support of the piston in its bottom end position, against the base 31 as shown in FIG. 1. For this reason, too, it is highly desirable to keep the amount of time that the piston 24 is in an end position as short as possible. During this time, the gas in the gas reservoir 53 acts as a spring for the joint volume of liquid in the liquid chamber 25 and the liquid reservoir 54. As a result, the spring action of the shock absorber 2 is maintained, which is particularly highly advantageous in the event of maintenance, for example, during strong winds, on the deck of ships or the like.

Step C: Said volume of liquid to be removed is then removed from the liquid chamber 25. This is done by opening valves 65 and 79 (with valves 74 and 75 being closed and with valve 64 also being closed). Optionally, the length of the shock absorber can be kept within desired values by switching valve 74 (in other words through the additional supply of gas from the gas chamber 26). Gas may now be released from the gas reservoir 53 to the outside air via the line 80. The line 80 accommodates a restriction 81 which limits the flow velocity of gas through line 80 when valve 79 is opened. As a result of the fact that this reduces the gas pressure in the gas reservoir 53, the piston 51 will move in such a way that the volume of the liquid reservoir 54 increases and the volume of the gas reservoir 53 decreases. In other words, a flow of liquid from the liquid chamber 25 to the liquid reservoir 54 arises. As a result of the fact that the position of the piston rod 52 and thus the piston 51 was previously sensed by the position sensor 84, as described above, it is now possible, by using the control means, during this flow of liquid, to sense a change in position of the piston rod 52, which is an indication of an increase in volume of the liquid reservoir 54, to sustain the flow until, using the position sensor 84 to carry out sensing, the volume of liquid to be removed from the liquid chamber 25 has been supplied to the liquid reservoir 54. At that time, valve 65 is closed. Now, the volume of the liquid chamber 25 of the shock absorber 2, or the partial volume occupied by the liquid, has reached its desired, pre-determined target level in accordance with the specification of the shock absorber. When bringing the volume of the liquid chamber 25 to the pre-determined target level, it is optionally possible to compensate for temperature and/or pressure dependence. To this end, a temperature sensor (represented diagrammatically by reference numeral 98 in FIG. 4 by way of example) may be connected to the input means, in order to measure the temperature of the surrounding air in the direct vicinity of the shock absorber, of the shock absorber itself, or of the liquid in, for example, the liquid line. The same applies to the gas. In the case of gas, compensation for temperature and/or pressure dependence is more important than with liquid. Therefore, a gas temperature sensor is preferably provided. In order to measure temperatures before carrying out the method, a small amount of liquid and/or gas can be introduced into the respective line, or at least brought into contact with the temperature sensor, so that the control means can use this as a basis for carrying out a temperature compensation calculation. It should be noted here that, in particular for gas, the target level is based on a desired gas mass (number of molecules). This desired gas mass is fixed for a certain shock absorber and, in order to carry out the method, the control means are preferably configured to determine the target level of the partial volume of the gas in the shock absorber from the desired gas mass and from a measured pressure and temperature.

In practice, it is conceivable that a negative value for the volume of liquid to be removed is determined during step B, i.e. a value is determined of the volume of liquid to be supplied to the liquid chamber 25. In other words, there is insufficient liquid present in the liquid chamber 25. If this is the case, valves 65, 74 and 75 are opened during step C while valve 79 remains closed. Now, gas can be transferred from the external gas supply device 73 under increased pressure into the line 70 and thus into the gas reservoir 53. As a result, a flow of liquid from liquid reservoir 54 to the liquid chamber 25 will occur.

Step D: Subsequently, position sensor 86 senses whether the length of the shock absorber 2 is in accordance with the specification, or at the target value. The value of the length parameter which is then sensed is an indication of the volume, in other words the total volume, of the interior space 23. As a result of the fact that, previously, no exact, pre-determined amount of gas was transferred to the gas chamber 26, this may lead to a deviation with respect to the length. If the sensed length is lower than that according to the target value, valve 74 is opened, as a result of which gas is transferred from the external supply reservoir into the gas chamber 26 until position sensor 86 senses that the length has reached its pre-determined target value. In other words, the volume of the gas chamber 26 of the shock absorber is then at its target level. Valve 74 is then closed. However, if the length is too great, valves 75 and 79 are opened, as a result of which gas can be released from the gas chamber 26 until position sensor 86 senses that the length has reached its pre-determined target value. Subsequently, lines 60 and 70 are disconnected from the shock absorber and the maintenance is completed.

In an exemplary embodiment of a method according to the invention, valve 74 is opened for a short time one or more times during the above-described step B1, as a result of which an amount of gas can be transferred from the external gas supply device 73 into line 70 and thus into the gas chamber 26 of the shock absorber and/or gas reservoir 53 (step B1a). If the length of the shock absorber 2 has decreased by more than a certain length, for example 2 mm, during step B1, step B1a is preferably carried out until this decrease in length has been compensated for again. Step B1a is completed by closing valve 74 and opening valve 75. In a highly accurate variant of step B1a, when valve 75 is open, valve 74 is actuated by the control device 90 on the basis of sensing the length of the shock absorber 2 by the position sensor 86. In other words, an output signal from the position sensor 86, which is an indication of the length of the shock absorber 2, is used as a feedback signal for the actuation of valve 74, with the actuation of valve 74 being such that the length of the shock absorber 2 is kept at least virtually the same during step B1.

Using optional step B1a during step B1 provides the significant advantage that the length of the shock absorber 2 is kept the same to an even greater degree as the maintenance is being carried out, in particular step B1 of the maintenance. As a result, the ground clearance of the aircraft thus remains the same to a large extent, as a result of which the orientation of the aircraft is also maintained. If step B1a is carried out during the method, carrying out optional A3 no longer offers any additional advantage.

In an alternative embodiment of the maintenance apparatus 1, the apparatus 1 is provided with two single-acting piston/cylinder assemblies 50a/51a and 50a'/51a', as shown in FIG. 8, instead of the double-acting piston/cylinder assembly 50/51 from FIG. 1. In that case, the liquid line 60 is connected to the cylinder chamber of one of the assemblies and the gas line 70 is connected to the cylinder chamber of the other assembly. More specifically, the liquid line 60 is connected to a liquid reservoir 54a, formed by the cylinder chamber of cylinder 50a'. Piston/cylinder assembly 50a'/51a' has a piston 51a' which delimits the liquid reservoir 54a. The gas line 70 is connected to a gas reservoir 53a, formed by the cylinder chamber of cylinder 50a. Piston/cylinder assembly 50a/51a has a piston 51a which delimits the gas reservoir 53a. Pistons 51a and 51a', via associated piston rods 52a, 52a' and a lever arm 55 connecting the two piston rods, together form a coupling member which is comparable to the coupling member of piston/cylinder assembly 50/51 from FIG. 1, which comprises the piston 51. The piston rods 52a, 52a' extend from the respective pistons 51a, 51a' through respective chambers 55a, 55a' which are at least approximately at the same pressure as one another, preferably both at ambient pressure, in other words in free communication with the surroundings. The coupling member further has, at the side of the lever arm 55 connected to the piston rod 52a', a loading member which is active between the lever arm 55 and a frame of the apparatus 1 and is in the form of a tension spring 56a. The loading member is configured to exert a compressive force on the liquid reservoir. In this way, the coupling member brings about a pressure difference during operation between liquid in the liquid reservoir 54a and gas in the gas reservoir 53a, with the liquid pressure being higher than the gas pressure. It should be noted for the sake of completeness that the lever arm 55 is connected to the frame of the apparatus 1 in such a way that it can pivot centrally, as illustrated diagrammatically in FIG. 8, and that the two cylinders 50a and 50a' are also connected to the frame of the apparatus. Furthermore, in the embodiment of the apparatus according to the invention with the two single-acting piston/cylinder assemblies 50a/51a and 50a'/51a', the position sensor 84 (illustrated in FIG. 1) is connected to the coupling member, for example to the piston rod 52a' of the coupling member. Instead of using the tension spring 56a, the loading member may also be formed by the two chambers 55a, 55a', in which case a mutually differing pressure, such as a gas pressure, can be applied. If the gas pressure in chamber 55a' is greater than that in chamber 55a, the same effect is achieved as with tension spring 56a. The gas pressure may be applied, for example, using the external gas supply device in combination with a pressure-regulating means. It should further be noted in this context that if the gas pressure in chamber 55a were adjusted to be greater than the gas pressure in chamber 55a', this would lead to a situation comparable to that shown in FIG. 2, to be described in further detail below, with the pressure in the gas reservoir 353 being greater than that in the liquid reservoir 354.

In a further alternative embodiment of the maintenance apparatus 1, the apparatus 1 is provided with a double-acting piston/cylinder assembly 50b/51b, as illustrated in FIG. 9, instead of the double-acting piston/cylinder assembly 50/51 from FIG. 1. In that case, the liquid line 60 is connected to one cylinder chamber and the gas line 70 is connected to another cylinder chamber of the assembly. More specifically, the liquid line 60 is connected to a liquid reservoir 54b, formed by one of the cylinder chambers of the cylinder 50b. The gas line 70 is connected to a gas reservoir 53b, formed by another cylinder chamber of cylinder 50b. Piston/cylinder assembly 50b/51b has a piston 51b which forms part of the coupling member and which separates the gas reservoir 53b from the liquid reservoir 54b in the same way as in cylinder 50 from FIG. 1. By providing the piston 51b in the cylinder 50b, the liquid reservoir 54b and the gas reservoir 53b are coupled, in a manner sealed against gas and liquid with respect to one another, in such a way that, during use, when the volume of one of the liquid reservoir 54b and the gas reservoir 53b increases, the volume of the other of the liquid reservoir 54b and the gas reservoir 53b decreases and that, during use, the pressure of the gas in the gas reservoir 53b provides a spring action to the pressurized liquid in the liquid reservoir 54b. Unlike piston rod 52 of piston 51, piston 51b has a piston rod 52b, 52b' of equal diameter on both sides, which also form part of the coupling member and which run through the gas and liquid reservoirs until they reach the outside of these reservoirs 53b, 54b. Piston rod 52b, like piston rod 52, runs through liquid reservoir 54b until it reaches the outside of the cylinder 50b, while piston rod 52b' runs through the gas reservoir 53b, in a sealed manner, through a fixed partition wall 57 within the cylinder 50b, into a further gas chamber 56b. This further gas chamber 56b contains a pressurized gas, thus forming a gas spring which is active on the free end of piston rod 52b'. In this way, the coupling member brings about a pressure difference during operation between liquid in the liquid reservoir 54b and gas in the gas reservoir 53b, with the liquid pressure being higher than the gas pressure. In an embodiment, the gas chamber 56b is connected or at least can be connected, for example via the illustrated gas line 72b, to the external gas supply device 73 in order to make it possible to change the gas pressure of the gas spring in the form of gas chamber 56b. Gas chamber 56b may also function as the external gas supply means, in other words as a substitute therefor, in which case the further gas supply line 72 is connected to the gas buffer, or may function as a gas buffer in addition to said external gas supply means 73. Furthermore, in the embodiment of the apparatus according to the invention with the double-acting piston/cylinder assembly 50b/51b, the position sensor 84 (illustrated in FIG. 1) is connected to the coupling member, for example to piston rod 52b of the coupling member, or alternatively, for example, to piston rod 52b' inside the further gas chamber 56b. When using the variant from FIG. 8 or 9, the above-described optional method step B1a is no longer advantageous, as the volume displaced by the piston 51a; 51b of the gas reservoir 53a; 53b in these variants remains equal to the volume displaced by the piston 51a'; 51b of the liquid reservoir 54a; 54b, as a result of which, during the exchange, the length of the shock absorber does not change as a result of the exchange. The same applies to optional step A3, wherein this step, if used, can also be carried out before or during step B2. When using the variants described with reference to FIGS.

8 and 9, it is also possible to use a method according to the invention in a state of the shock absorber in which it is free from load under the influence of the weight of the aircraft, such as is the case when the aircraft is jacked up, with wheels belonging to the shock absorber being clear of the ground.

The variants from FIGS. 8 and 9 are applicable to the preferred embodiments described and to be described of maintenance apparatus according to the invention.

The following steps are carried out using a preferred embodiment of the maintenance apparatus according to the invention from FIG. 3, which substantially corresponds to the preferred embodiment of the apparatus from FIG. 1 and is therefore provided with the same reference numerals for identical parts or parts having the same function, and another type of shock absorber than from FIG. 1, which other type is illustrated in FIG. 3 and will be explained in further detail below.

In contrast to shock absorber 2 from FIG. 1, shock absorber 102 from FIG. 3 has no piston which separates a gas chamber from a liquid chamber. The total volume of the interior space 123 of shock absorber 102 is divided into a, lower, partial volume 125 of the volume of the interior space, which is occupied by the liquid, and a, remaining, higher, partial volume 126 of the volume of the interior space 123, which is occupied by the gas. The liquid surface forms the division between the two said partial volumes 125, 126. A pipe section 132 is also provided in the interior space 123. The pipe section 132 is relevant in the case of a shock absorber in which the target level of the partial volume of the liquid is such that it cannot be reached in the absence of gas in the shock absorber. In other words, the shock absorber reaches its end-of-stroke position. The pipe section 132 is also relevant if the shock absorber is limited in its stroke for other reasons, for example due to the fact that an underside of the aircraft touches the ground if the length of the shock absorber is too small. When carrying out step C, in such cases an amount of gas is first transferred into the interior space, with the length of the pipe section 132 being such that, despite this amount of gas, it is still possible to remove liquid, and therefore not gas, from the interior space via the liquid line. See also the description of step B4 below.

The apparatus 100 from FIG. 3 has a gas line 170 which is the same as line 70, but which additionally comprises a liquid blocking valve 133 near the end of the line 170 which is connected to the nipple 178. The liquid blocking valve 133 is configured, during operation, to allow gas to pass through in both directions but to close as a result of contact with liquid in the gas line 170. In contrast to the situation from FIG. 1, gas line 170 is also connected to the interior space 123 of the shock absorber 102 at the top of the shock absorber 102 via a connection nipple 178. This is because, in shock absorber 102, the gas is present in the top of the shock absorber on account of the lower density combined with the absence of a piston such as piston 24. For the rest, the apparatus 100 is the same as the apparatus 1 from FIG. 1. The above-described variant from FIG. 8 or 9 can also be used with apparatus 100 in an analogous way as is the case with apparatus 1.

Step A: The apparatus 100 is brought into the vicinity of the aircraft 7 with the landing gear 3 of which the shock absorber 102 forms part (step A1). This can be done, for example, by driving the apparatus 100, which may be provided on a trolley, to the aircraft. The aircraft can continue to rest on its landing gear; it does not need to be jacked up or the like in order to relieve the shock absorber 102 of its load. Furthermore, reference is made to the above, analogously applicable, description of step A when using shock absorber 2, with it being noted that in the current situation from FIG. 3, the liquid line 60 and the gas line 170 are connected to the shock absorber 102 via connection nipples 168, 178 provided for that purpose.

Optionally, the length of the shock absorber 102 is then increased slightly, for example by 5%, by supplying an amount of gas to the interior space 123 from the external gas supply device 73 after opening valve 74 (Step A3). This increases the ground clearance of the aircraft. Valve 74 is then closed once again.

Step B1 is comparable to the above-described step B1 for the embodiment from FIG. 1. Subsequently, valves 65 and 75 are opened, with valves 74, 79 and 64 remaining closed. As a result of the fact that, in cylinder 50, the pressure in the liquid reservoir 54 is always higher than the pressure in the gas reservoir 53 if the force on the piston 51 remains the same, an exchange of liquid from the from the liquid reservoir 54 to the interior space 123 and of gas from the interior space 123 to the gas reservoir 53 will arise due to said difference in active surface area as a result of the piston rod 52. The partial volume 126 of the interior space 123 occupied by the gas thus decreases, while the remaining partial volume 125 of the interior space 123 occupied by the liquid increases. In this case, the speed of the flow of the exchange is dependent on the hydraulic resistance which is exerted on the liquid by the hydraulic resistance in the form of restriction 66.

The liquid pressure and gas pressure, respectively, are measured by the two pressure gauges 67, 77, belonging to the detection means. If the partial volume 126 of the interior space 123 occupied by the gas has reached a minimum level that can be reached, being the reference level, more specifically has reduced to zero, liquid will flow into the gas line 170. However, as soon as this liquid comes into contact with valve 133, the gas line 170 closes. In other words, the liquid cannot flow past valve 133 into the gas line 170. At that moment, the pressure gauges 67, 77 will sense a change in the relative pressure of the liquid with respect to the gas.

Step B2 is comparable to the above-described step B2 for the embodiment from FIG. 1. The value of a length parameter of the shock absorber is subsequently sensed using the position sensor 86. On account of the minimum level of the partial volume of the interior space occupied by the gas that can be reached, which is known, this value is an indication of the partial volume of the interior space occupied by the liquid at that time. The position of the piston rod 52 is sensed using position sensor 84 (Step B3). As a result, the volume of the liquid reservoir 54 is also known. Valve 75 is also closed.

As a result of the fact that, as described above in step B1, extra liquid has flowed from the liquid reservoir 54 into the interior space 123 during the exchange of gas and liquid between cylinder 50 and shock absorber 102, the partial volume 125 of the interior space 123 occupied by the liquid is greater than desired, in other words greater than the target level, in accordance with the specification of the shock absorber. From said length of the shock absorber 102 sensed using the position sensor 86 and known information about the geometry of the shock absorber 102, it is possible to infer the volume of liquid which must ultimately be removed from the shock absorber 102 in order to bring the part 125 of the volume of the interior space 123 occupied by the liquid to the target level. This volume of liquid to be removed, or at least a parameter related thereto, is stored in the memory of the control unit 90.

Step B4: Subsequently, valve 74 is opened and an amount of gas is supplied from the external gas supply device 73 to the interior space 123, which amount is at least such that the shock absorber 2 assumes a length which is greater than its desired, pre-determined length at the end of the maintenance. Subsequently, valve 74 is closed again.

Step C is comparable to the above-described step C for the embodiment from FIG. 1. Said volume of liquid to be removed is then removed from the interior space 123. This is done by opening valves 65 and 79 (with valves 64, 74 and 75 being closed). Gas may now be released from the gas reservoir 53 to the outside air via the line 80. The line 80 accommodates a restriction 81 which limits the flow velocity of gas through line 80 when valve 79 is opened. As a result of the fact that this reduces the gas pressure in the gas reservoir 53, the piston 51 will move in such a way that the volume of the liquid reservoir 54 increases and the volume of the gas reservoir 53 decreases. In other words, a flow of liquid from the interior space 123 to the liquid reservoir 54 arises. As a result of the fact that the position of the piston rod 52 and thus the piston 51 was previously sensed, as described above, it is now possible, by sensing, during this flow of liquid, a change in position of the piston rod, which is an indication of an increase in volume of the liquid reservoir 54, to sustain the flow until, using the position sensor 84 to carry out sensing, the volume of liquid to be removed from the interior space 123 has been supplied to the liquid reservoir 54. At that time, valve 65 is closed. Now, the partial volume of the interior space 123 of the shock absorber 102 occupied by the liquid has reached its desired, pre-determined target level in accordance with the specification of the shock absorber 102.

Step D is comparable to the above-described step D for the embodiment from FIG. 1. Subsequently, position sensor 86 senses whether the length of the shock absorber 102 is at the target value in accordance with the specification. As a result of the fact that, previously, no exact, pre-determined amount of gas was transferred into the interior space, this may lead to a deviation with respect to the length. If the sensed length is lower than that according to the specification, valve 74 is opened, as a result of which gas is transferred from the external supply reservoir into the interior space 123 until position sensor 86 senses that the length has reached its pre-determined target value. In other words, the partial volume of the interior space 123 occupied by the gas is then also at its target level. Valve 74 is then closed. However, if the length is too great, valves 75 and 79 are opened, as a result of which gas can be released from the interior space 123 until position sensor 86 senses that the length has reached its pre-determined target value. Subsequently, lines 60 and 70 are disconnected from the shock absorber and the maintenance is completed.

In an exemplary embodiment of a method according to the invention, valve 75 is closed and valve 74 is opened for a short time one or more times during the above-described step B1, as a result of which an amount of gas can be transferred from the external gas supply device 73 into line 70 and thus into the interior space 123 of the shock absorber and/or gas reservoir 53 (analogous to step B1a). For the rest, reference is made to the above description with respect to step B1a, which applies analogously.

The following steps are carried out using the above-described preferred embodiment of the apparatus according to the invention from FIG. 4, which corresponds to the apparatus 100 from FIG. 3 and is thus provided with the same reference numbers, and yet another type of shock absorber than those from FIGS. 1 and 3, which yet other type is illustrated in FIG. 4 and will be described in further detailed below.

The shock absorber 202, being a dual-stage shock absorber, has, in contrast to the shock absorber 102, a gas chamber 226A at the bottom of the shock absorber, which is separated from the remaining part of the interior space 223 by a freely moveable piston 224, which remaining part, analogously to shock absorber 102, has a lower part 225 of the volume of the interior space, which is occupied by the liquid, and a higher part 226 of the volume of the interior space 223, which is occupied by the gas. The liquid surface forms the division between the two said parts 225, 226.

The method for maintaining such a shock absorber 202 corresponds to the method described above for maintaining shock absorber 102, with two additional steps:

The first additional step is that, during step A, the gas line 170 is connected to nipple 178A before it is connected to nipple 178, as a result of which the gas line 170 is connected to gas chamber 226A. Subsequently, valve 74 is opened and gas is transferred into gas chamber 226A at increased pressure, in such a way that piston 224 moves to its top end position, if the piston 224 is not already in this position. The gas pressure applied in gas chamber 226A is in any case made higher than a gas pressure which prevails in the interior space 223 of the shock absorber 202 during the rest of the method. In fact, the gas chamber 226A and piston 224 are thus rendered inactive, or blocked. Subsequently, gas line 170 is disconnected from nipple 178A and connected to nipple 178. Then, the entire method described above with reference to FIG. 3 is carried out. However, when bringing the part 226 of the volume of the interior space 223 which the gas occupies to specification in accordance with step D, the fact that gas chamber 226A is still completely full is taken into consideration. Finally, the gas line 170 is once again connected to nipple 178A and the length of the shock absorber 202 is brought to specification or the target value using position sensor 86 by allowing gas to be released from the gas chamber 226A into the surroundings via valve 79. Alternatively, the pressure in the gas chamber 226A is decisive. This may be the case if gas chamber 226A, during operation, is active in absorbing high (impact) loads, with the piston 224, in its neutral position, being in the top end position mentioned above, as illustrated in FIG. 4. In this case, finally, the gas line 170 is thus connected to nipple 178A once again and the pressure in the gas chamber 226A of the shock absorber 202 is brought to specification or target value using, for example, pressure sensor 77, by allowing gas to be released from the gas chamber 226A into the surrounds via valve 79, if the pressure is too high.

A further embodiment of a shock absorber suitable to be maintained using an apparatus according to the invention corresponds to a large extent to shock absorber 202 from FIG. 4. However, a second freely moveable piston is provided in the part of the interior space which comprises both gas and liquid. In that case, the pipe section 132 is absent. A gas chamber, a free piston, a liquid chamber, a free piston and a gas chamber are successively provided in the shock absorber, from top to bottom.

Bearing in mind the above-mentioned additions to the method, with reference to FIG. 4, the method can be used on the shock absorber 2 from FIG. 1.

The maintenance apparatus 300 according to the invention, from FIG. 2, has a double-acting cylinder 350 with a coupling member in the form of a piston 351 which can move in a reciprocating manner in the cylinder and which has a piston rod 352 extending freely outside the cylinder, in a similar way to the apparatus 1, 100. The piston 351 separates a liquid reservoir 354 from a gas reservoir 353 in a manner sealed against gas and liquid.

As a result of the fact that, unlike in apparatus 1, 100, the piston rod 52 extends from the piston 351 through the gas reservoir 353 until it reaches the outside of the cylinder 350, the active surface area of the liquid on one side, in the present exemplary embodiment the side of the liquid chamber 354, of the piston 351 is greater than the active surface area of the gas on the other side of the piston 351, at the side of the gas chamber 353. As a result, the pressure of the gas during use is always higher than the pressure of the liquid, or there is a pressure difference during use between liquid and gas, on account of the equilibrium of forces on the piston 351.

For the rest, apparatus 300 is the same as apparatus 1, 100.

The following steps are carried out using the above-described preferred embodiment of the apparatus 300 according to the invention from FIG. 2 and an above-described type of shock absorber from FIG. 1, in other words shock absorber 2 having a freely moveable piston 24.

Step A is analogous to Step A according to the preferred embodiment from FIG. 1.

Step B1: Subsequently, valves 65 and 75 are opened using the output means 93 of the control means 90, with valves 74, 79 and 64 remaining closed. As a result of the fact that, in cylinder 350, the pressure in the gas reservoir 353 is always higher than the pressure in the liquid reservoir 354 if the force on the piston 351 remains the same, due to said difference in active surface area as a result of the piston rod 352, an exchange will arise in the form of a flow of gas from the gas reservoir 353 to the gas chamber 26 and of liquid from the liquid chamber 25 to the liquid reservoir 354.

The liquid pressure and gas pressure, respectively, are measured by the two pressure gauges 67, 77. If the piston 24 of the shock absorber 2 reaches its end position against the intermediate plate 30 of cylinder part 22, which means that the partial volume of the interior space occupied by the gas, or the volume of the gas chamber 26, has reached a maximum level that can be reached, or reference level, the control means will sense a change in the relative pressure of the liquid with respect to the gas, since in any case the pressure in the gas chamber significantly increases at that time, as a result of which it is detected that the partial volume of the interior space of the shock absorber occupied by the gas has reached a maximum level that can be reached, being the reference level.

Step B2: At that time, the value of a length parameter of the shock absorber is sensed using the position sensor 86 and stored in the memory of the control unit. On account of the maximum level of the partial volume of the interior space occupied by the gas, which is known, this value is an indication of the partial volume of the interior space occupied by the liquid at that time, or the volume of the liquid chamber. This volume of the liquid chamber can be calculated by the control means from the sensed length parameter and data on the shock absorber which are stored in the memory. The position of the piston rod 352 is sensed using position sensor 84 and stored in the memory of the control unit (Step B3). As a result, the volume of the liquid reservoir 354 is also known.

As a result of the fact that, as described above in step B1, liquid has flowed from the liquid chamber 325 to the liquid reservoir 54 during the exchange of gas and liquid between cylinder 350 and shock absorber 2, the volume of liquid in the liquid chamber 25 is smaller than desired, in other words smaller than its target level according to the specification of the shock absorber. From said length of the shock absorber 2 sensed using the position sensor 86 and known information about the geometry of the shock absorber 2, it is possible to infer the volume of liquid which must ultimately be supplied to the shock absorber 2 in order to bring the volume occupied by the liquid in the liquid chamber 25 to its target level. This volume of liquid to be supplied, or at least a parameter related thereto, is stored in the memory of the control unit 90.

Step B4 is not called for in the present exemplary embodiment.

Step C: Said volume of liquid to be supplied is then supplied to the liquid chamber 25. This is done by opening valves 74 and 75 while valve 79 remains closed (and valve 65 remains open). Gas may now be transferred from the external gas supply device 73 at increased pressure into the line 70 and thus into the gas reservoir 353. As a result of the fact that this increases the gas pressure in the gas reservoir 353, the piston 351 will move in such a way that the volume of the liquid reservoir 354 decreases and the volume of the gas reservoir 353 increases. In other words, a flow of liquid from the liquid reservoir 354 to the liquid chamber 25 arises. As a result of the fact that the position of the piston rod 352 and thus the piston 351 was previously sensed, as described above, it is now possible, by using the control means, during this flow of liquid, to sense a change in position of the piston rod, which is an indication of a decrease in volume of the liquid reservoir 354, to sustain the flow until, using the position sensor 84 to carry out sensing, the volume of liquid to be supplied to the liquid chamber 25 has been removed from the liquid reservoir 354. At that time, valve 65 is closed. Now, the volume of the liquid chamber 25 of the shock absorber 2, or the volume part occupied by the liquid, has reached its target level in accordance with the specification of the shock absorber.

Step D: Subsequently, position sensor 86 senses whether the length of the shock absorber 2 is at the target value in accordance with the specification. The value of the length parameter which is then sensed is an indication of the volume, in other words the total volume, of the interior space. As a result of the fact that the gas chamber 26 is still at its maximum volume, this will lead to a deviation with respect to the length, in the sense that the volume of the gas chamber 26 is greater than that according to the target level. Valves 75 and 79 are opened, as a result of which gas can be released from the gas chamber 26 until position sensor 86 senses that the length has reached its pre-determined value, meaning that the partial volume occupied by the gas is also at the target level. Subsequently, lines 60 and 70 are disconnected from the shock absorber and the maintenance is completed.

The invention claimed is:

1. A maintenance apparatus (1) for a shock absorber (2) of a landing gear (3) of an aircraft (7), which shock absorber has an interior space (23) with a volume in which a gas and a liquid are provided, the gas and the liquid each occupying a partial volume of the volume of the interior space, the maintenance apparatus being configured to bring the partial volume respectively occupied by the gas and the liquid to a pre-determined target level, the maintenance apparatus (1) comprising:

a liquid reservoir (54) which is configured to accommodate a pressurized liquid, a liquid line (60) which is connected to the liquid reservoir (54) and which can be connected to the interior space (23) of the shock absorber (2) in order to connect the liquid reservoir and the interior space of the shock absorber to one another to allow the flow of liquid, a gas reservoir (53) which is configured to accommodate a pressurized gas, a gas line (70) which is connected to the gas reservoir (53) and which is configured to be connected to the interior space (23) of the shock absorber (2) in order to connect the gas reservoir and the interior space of the shock absorber to one another to allow the flow of gas, a coupling member (51) which is designed in order to sealingly couple the liquid reservoir (54) and the gas reservoir (53) to one another in such a way that, during use:

if the volume of one of the liquid reservoir (54) and the gas reservoir (53) increases, the volume of the other of the liquid reservoir and the gas reservoir decreases, a pressure of the gas in the gas reservoir (53) provides a spring action to the pressurized liquid in the liquid reservoir (54) via the coupling member (51), and the coupling member (41) causes a pressure difference between the pressure in the liquid reservoir (54) and the pressure in the gas reservoir (53), wherein the maintenance apparatus (1) is configured to allow an exchange to occur during operation of, on the one hand, liquid between the liquid reservoir (54) and the interior space (23) of the shock absorber (2) and, on the other hand, simultaneously, of gas between the gas reservoir (53) and the interior space (23) of the shock absorber, in order to bring the partial volume occupied by the gas to a pre-determined reference level as a result of the exchange, wherein the maintenance apparatus (1) further comprises:

control means (90) comprising input means (92) which are configured to receive a signal, originating from detection means (67, 77) connected to the shock absorber (2) during operation, which varies in dependence on the partial volume occupied by the gas, wherein the control means are configured to determine from that signal that the partial volume occupied by the gas reaches the reference level as a result of the exchange and to subsequently emit a signal, using output means (93) of the control means, in order to bring the partial volume of the volume of the interior space (23) of the shock absorber (2) respectively occupied by the gas and the liquid to the target level on the basis of said signal.

2. The maintenance apparatus (1) according to claim 1, wherein the liquid line (60) comprises a liquid shut-off valve (65) for shutting off, in a closed position, and opening up, in an open position, the connection to allow the flow of liquid via the liquid line, wherein the apparatus (1) comprises a further gas line (72) for connecting the interior space (23) of the shock absorber (2) to an external gas supply device (73) to allow the flow of gas, wherein the gas line (70) comprises a first gas shut-off valve (75) for shutting off, in a closed position, and opening up, in an open position, the connection to allow the flow of gas via the gas line, wherein the further gas line (72) comprises a second gas shut-off valve (74) for shutting off, in a closed position, and opening up, in an open position, the connection to allow the flow of gas via the further gas line, wherein the apparatus (1) comprises a third gas shut-off valve (79) for shutting off, in a closed position, and opening up, in an open position, an outlet for gas originating from the interior space (23) of the shock absorber (2), wherein the output means (93) of the control means (90) are operatively connected to the liquid shut-off valve (65) and to the first (75), second (74) and third gas shut-off valve (79), in order to actuate said valves in an automated manner to allow them to be switched between the respective closed position and open position, by means of the emission of a signal to one or more of said valves.

3. The maintenance apparatus according to claim 1, comprising length-sensing means (86) which interact with the shock absorber (2) during operation, for sensing a length parameter of the shock absorber which is related to a length dimension in the longitudinal direction (6a) of the shock absorber, which length-sensing means are connected to the input means (92) of the control means (90).

4. The maintenance apparatus according to claim 1, comprising sensing means (84) for sensing a parameter which is related to the volume of the liquid reservoir (54).

5. The maintenance apparatus according to claim 1, comprising a damping member for limiting a flow velocity of liquid and gas during said exchange.

6. The maintenance apparatus according to claim 1, wherein the liquid reservoir (54) and/or the gas reservoir (53) is determined by a piston/cylinder assembly (51/50; 50a/51a, 50a'/51a'; 50b/51b).

7. The maintenance apparatus according to claim 6, wherein the liquid reservoir (54a) is determined by a piston/cylinder assembly (50a'/51a') and wherein the gas reservoir (53a) is determined by a piston/cylinder assembly (50a/51a), wherein the piston (51a') of the piston/cylinder assembly of the liquid reservoir and the piston (51a) of the piston/cylinder assembly of the gas reservoir form part of the coupling member.

8. The maintenance apparatus according to claim 6, wherein the piston/cylinder assembly of the liquid reservoir and the piston/cylinder assembly of the gas reservoir are configured as a single double-acting cylinder (50; 50b) with a piston (51; 51b) which forms both the piston of the gas reservoir and of the liquid reservoir, which piston forms part of the coupling member, and which piston at one side delimits the liquid reservoir and at the other side delimits the gas reservoir.

9. The maintenance apparatus according to claim 8, wherein the piston has a piston rod which runs through at least one of the liquid reservoir and the gas reservoir.

10. The maintenance apparatus according to claim 1, further comprising the detection means, which can be connected to the shock absorber, in order to emit the signal to the input means, which signal varies in dependence on the partial volume occupied by the gas.

11. The maintenance apparatus according to claim 10, wherein the detection means comprise a pressure gauge (67, 77) connected to the input means for measuring a pressure in the interior space (23) of the shock absorber and for emitting a pressure signal to the input means.

12. The maintenance apparatus according to claim 1, wherein said reference level is a maximum or minimum level that can be reached.

13. The maintenance apparatus according to claim 1, configured for a shock absorber with a piston (24) which can move in a freely reciprocating manner in the interior space and which separates the interior space into a liquid chamber (25) for accommodating the liquid and a gas chamber (26) for accommodating the gas, wherein the liquid line, during operation, is connected to the liquid chamber and wherein the gas line, during operation, is connected to the gas chamber, wherein said reference level is a maximum or minimum level that can be reached, determined by a first or second end position, respectively, of the piston in the interior space.

14. The maintenance apparatus according to claim 1, configured for maintaining a shock absorber which is free of a piston which can move in the interior space, in which shock absorber a liquid surface of liquid (125) in the interior space forms a division between the gas (126) and the liquid in the interior space of the shock absorber, wherein the maintenance apparatus comprises a liquid blocking valve (133) in the gas line, which is configured, during operation, to allow gas to pass through but, as a result of contact with liquid in the gas line, to close the gas line against the flow of liquid or gas, wherein said reference level is a minimum level that can be reached.

15. The maintenance apparatus according to claim 1, wherein the pressure difference brought about by the coupling member is such that the pressure in the liquid reservoir is greater than the pressure in the gas reservoir, wherein said reference level is a minimum level that can be reached.

16. The maintenance apparatus according to claim 9, wherein the double-acting cylinder is designed in such a way that an active surface area for liquid on the piston is smaller than an active surface area for gas on the piston.

17. The maintenance apparatus according to claim 1, wherein, during operation, the pressure difference brought about by the coupling member is such that the pressure in the liquid reservoir is smaller than the pressure in the gas reservoir, wherein said reference level is a maximum level that can be reached.

18. The maintenance apparatus according to claim 1, wherein the control means are configured, during operation and after, in accordance with a step A), the interior space of the shock absorber has been connected to a liquid reservoir to allow the flow of liquid and has been connected to a gas reservoir to allow the flow of gas and an external gas supply device has been connected to the interior space, to carry out the following steps in an automated manner:

B) allowing the exchange to occur, on the one hand of liquid between the liquid reservoir and the interior space of the shock absorber, and on the other hand, simultaneously, of gas between the gas reservoir and the interior space of the shock absorber, until the control means determine that the partial volume occupied by the gas has reached a reference level, wherein the liquid reservoir and the gas reservoir are operatively connected to one another during said exchange in such a way that a pressure of the gas in the gas reservoir provides a spring action to the pressurized liquid in the liquid reservoir, C) bringing the partial volume occupied by the liquid to the target level by means of supplying liquid from the liquid reservoir to the interior space or removing liquid from the interior space to the liquid reservoir, D) bringing the partial volume of the interior space occupied by the gas to the target level by means of supplying gas to or removing gas from the interior space.

19. A method for maintaining a shock absorber (2) of a landing gear (3) of an aircraft (7), the shock absorber having an interior space with a volume in which a gas and a liquid are provided, the gas and the liquid each occupying a partial volume of the volume of the interior space, wherein, according to the method, the partial volume respectively occupied by the gas and the liquid is brought to a pre-determined target level, the method comprising the steps of:

A) connecting the interior space (23) of the shock absorber to a liquid reservoir (54) to allow the flow of liquid and connecting the interior space (23) of the shock absorber to a gas reservoir (53) to allow the flow of gas, B) allowing an exchange to occur, on the one hand of liquid between the liquid reservoir and the interior space of the shock absorber, and on the other hand, simultaneously, of gas between the gas reservoir and the interior space of the shock absorber, until it is determined that the partial volume occupied by the gas has reached a reference level, wherein the liquid reservoir and the gas reservoir are operatively connected to one another during said exchange in such a way that the pressure of the gas in the gas reservoir provides a spring action to the pressurized liquid in the liquid reservoir, C) bringing the partial volume occupied by the liquid to the target level by means of supplying liquid from the liquid reservoir to the interior space or removing liquid from the interior space to the liquid reservoir, D) bringing the partial volume of the interior space occupied by the gas to the target level by means of supplying gas to or removing gas from the interior space.

20. The method according to claim 19, comprising, as part of step B), after determining that the partial volume of the interior space of the shock absorber occupied by the gas has reached a reference level, and preceding step C), the step of:

B2) sensing a length parameter of the shock absorber which is related to a length dimension in the longitudinal direction of the shock absorber, which length parameter is thus also associated with the volume of the interior space of the shock absorber.

21. The method according to claim 19, comprising, as part of step B), after determining that the partial volume of the interior space of the shock absorber occupied by the gas has reached a reference level, and preceding step C), the step of:

B3) sensing a parameter which is related to the volume of the liquid reservoir.

22. The method according to claim 20, comprising, as part of step C):

determining, on the basis of the sensed length parameter of the shock absorber and the parameter of the liquid reservoir, a volume of liquid to be supplied to the interior space or to be removed from the interior space, and subsequently bringing the partial volume of the interior space occupied by the liquid to the target level by means of supplying liquid from the liquid reservoir to the interior space of the shock absorber or removing liquid from the interior space of the shock absorber, with continuous sensing of the parameter of the liquid reservoir.

23. The method according to claim 20, wherein said reference level according to step B) is a minimum level that can be reached, wherein the method comprises, as part of step B), after step B2) and preceding step C) the step of:

B4) supplying gas to the interior space from an external gas supply device.

24. The method according to claim 20, comprising, as part of step D):
- D1) sensing the length parameter of the shock absorber, and
- D2) bringing the partial volume occupied by the gas to the target level by means of supplying gas to or removing gas from the interior space of the shock absorber.

25. The method according to claim 19, wherein, in order to carry out the method, use is made of a maintenance apparatus according to claim 1, wherein, as part of step A), the liquid line and the gas line are brought into connection with the interior space,
   wherein steps B) and C) and D) are carried out using the control means,
   wherein the spring action according to step B) is provided via the coupling member.

26. The method according to claim 19 using a maintenance apparatus according to claim 14,
   wherein said reference level according to step B) is a minimum level that can be reached, and
   wherein step B) comprises allowing an exchange to occur, on the one hand of liquid between the liquid reservoir and the interior space of the shock absorber, and on the other hand, simultaneously, of gas between the gas reservoir and the interior space of the shock absorber, wherein liquid flows to the interior space and gas flows to the gas reservoir until the liquid blocking valve closes the gas line as a result of coming into contact with liquid in the gas line as a result of the fact that the partial volume of the interior space of the shock absorber occupied by the gas has reached a minimum level that can be reached, as a result of which it is determined using the control means that the partial volume of the interior space of the shock absorber occupied by the gas has reached the reference level.

27. Use of the maintenance apparatus according to claim 1, for maintaining a shock absorber of a landing gear of an aircraft in accordance with a method according to claim 9, wherein the maintenance apparatus is configured to bring the partial volume respectively occupied by the gas and the liquid to a pre-determined target level.

* * * * *